US012149012B1

(12) United States Patent
Brown

(10) Patent No.: US 12,149,012 B1
(45) Date of Patent: Nov. 19, 2024

(54) MULTI-BAND ANTENNA DEVICE AND TUNING TECHNIQUES

(71) Applicant: Geotab Inc., Oakville (CA)

(72) Inventor: Matthew Douglas Brown, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/651,963

(22) Filed: May 1, 2024

Related U.S. Application Data

(60) Provisional application No. 63/632,757, filed on Apr. 11, 2024.

(51) Int. Cl.

*H01Q 9/04* (2006.01)
*H01Q 1/38* (2006.01)
*H01Q 9/16* (2006.01)

(52) U.S. Cl.

CPC ............. *H01Q 9/0442* (2013.01); *H01Q 1/38* (2013.01); *H01Q 9/16* (2013.01)

(58) Field of Classification Search

CPC .......... H01Q 9/0442; H01Q 1/38; H01Q 9/16; H01Q 1/243

See application file for complete search history.

(56) References Cited

U.S. PATENT DOCUMENTS 6,239,765 B1 5/2001 Johnson et al.
6,424,300 B1 7/2002 Sanford et al.
6,515,627 B2 2/2003 Lopez et al.
6,563,466 B2 5/2003 Sadler et al.
6,603,430 B1 8/2003 Hill et al.
6,650,294 B2 * 11/2003 Ying .................... H01Q 9/0421 343/702
6,650,295 B2 11/2003 Ollikainen et al.
6,734,825 B1 5/2004 Guo et al.
6,738,023 B2 5/2004 Scott et al.
6,795,026 B2 9/2004 Chiu et al.
6,992,627 B1 1/2006 Honda et al.
7,023,387 B2 4/2006 Wen et al.
7,095,372 B2 8/2006 Soler Castany et al.
7,230,571 B2 6/2007 Gaucher et al.
7,239,279 B2 7/2007 Wen et al.

(Continued)

FOREIGN PATENT DOCUMENTS

TW 595040 B 6/2004

OTHER PUBLICATIONS

Lee et al., Very-low-profile bent planar monopole antenna for GSM/DCS dual-band mobile phone. Microwave and Optical Technology Letters. Sep. 20, 2002;34(6):406-9.

(Continued)

*Primary Examiner* — David E Lotter

(74) *Attorney, Agent, or Firm* — Wolf, Greenfield & Sacks, P.C.

(57) ABSTRACT

Described herein are antenna configurations that, in some embodiments, may be advantageously tuned to achieve desired electromagnetic performance over multiple resonant frequencies by providing control, in the design process, over some or all of the desired resonant frequencies. Such antenna configurations, in some embodiments, may be configured to achieve a large frequency bandwidth in a static physical layout, without necessarily resorting to a reconfigurable feed path.

20 Claims, 31 Drawing Sheets

(56) References Cited

U.S. PATENT DOCUMENTS

| | | | |
|---|---|---|---|
| 7,298,339 B1 | 11/2007 | Ollikainen | |
| 7,339,527 B2 | 3/2008 | Sager et al. | |
| 7,443,344 B2 | 10/2008 | Boyle | |
| 7,489,276 B2 | 2/2009 | Qi et al. | |
| 7,525,502 B2 | 4/2009 | Hui et al. | |
| 7,872,605 B2 | 1/2011 | Baliarda et al. | |
| 7,907,092 B2 | 3/2011 | Soler Castany et al. | |
| 8,362,960 B2 | 1/2013 | Mumbru et al. | |
| 8,456,365 B2 | 6/2013 | Pros et al. | |
| 8,593,349 B2 | 11/2013 | Baliarda et al. | |
| 11,031,677 B2 | 6/2021 | Puente Baliarda et al. | |
| 2001/0052877 A1 | 12/2001 | Honda et al. | |
| 2002/0000940 A1 | 1/2002 | Moren et al. | |
| 2002/0149527 A1 | 10/2002 | Wen et al. | |
| 2002/0190905 A1 | 12/2002 | Flint et al. | |
| 2003/0122726 A1 | 7/2003 | Abbasi et al. | |
| 2004/0027288 A1 | 2/2004 | Okubora et al. | |
| 2004/0137950 A1* | 7/2004 | Bolin | H01Q 5/40 455/562.1 |
| 2004/0145529 A1 | 7/2004 | Iguchi et al. | |
| 2004/0257285 A1 | 12/2004 | Illera et al. | |
| 2005/0195124 A1 | 9/2005 | Puente Baliarda et al. | |
| 2005/0248489 A1 | 11/2005 | Kim et al. | |
| 2005/0259013 A1 | 11/2005 | Gala Gala et al. | |
| 2007/0040751 A1 | 2/2007 | Boyle | |
| 2007/0252773 A1 | 11/2007 | Soler Castany et al. | |
| 2008/0062049 A1 | 3/2008 | Soler Castany et al. | |
| 2008/0198082 A1 | 8/2008 | Soler Castany et al. | |
| 2008/0231521 A1 | 9/2008 | Anguera Pros et al. | |
| 2008/0252536 A1 | 10/2008 | Anguera et al. | |
| 2009/0002248 A1 | 1/2009 | Zhao et al. | |
| 2009/0146906 A1 | 6/2009 | Anguera Pros et al. | |
| 2012/0026058 A1 | 2/2012 | Illera et al. | |
| 2014/0015728 A1 | 1/2014 | Anguera Pros et al. | |
| 2014/0015730 A1 | 1/2014 | Anguera Pros et al. | |

OTHER PUBLICATIONS

Hu et al., A compact multi-band antenna design for mobile handsets. 2005 Asia-Pacific Microwave Conference Proceedings. Dec. 4, 2005. 4 pages.

Wong et al., Isolation between GSM/DCS and WLAN antennas in a PDA phone. Microwave and optical technology letters. May 20, 2005;45(4):347-52.

* cited by examiner

MULTI-BAND ANTENNA DEVICE AND TUNING TECHNIQUES

CROSS-REFERENCE TO RELATED APPLICATIONS

This application claims the benefit under 35 U.S.C. § 119(e) of U.S. Provisional Application No. 63/632,757, filed Apr. 11, 2024, and entitled, “MULTI-BAND ANTENNA DEVICE AND TUNING TECHNIQUES,” the contents of which herein incorporated by reference in their entirety.

TECHNICAL FIELD

The present disclosure relates generally to antenna devices, and in particular relates to multi-band antenna devices that may be implemented in mobile devices.

BACKGROUND

Mobile devices are used in many frequency bands to achieve multiple radio technologies (e.g., cellular, Wi-Fi®/Bluetooth®, GPS, etc.), and/or to achieve high speed cellular connectivity using current cellular technologies (4G, LTE®, 5G). Generally, one or more dedicated antennas may be provided for each radio technology, as each radio technology usually operates in a different frequency band. Current cellular technologies operate across a wide range of frequency bands to achieve a large number of channels.

SUMMARY

According to a broad aspect, the present disclosure describes an antenna device, comprising: a dielectric support; a first conductor disposed on the dielectric support and comprising a signal feed terminal; and a second conductor disposed on the dielectric support and comprising a reference feed terminal, the second conductor being spaced from the first conductor by a gap, and the gap comprising: a first region, in which the first conductor is spaced from the second conductor by a first gap distance; a second region, in which the first conductor is spaced from the second conductor by a second gap distance different from the first gap distance; and a third region, in which the first conductor is spaced from the second conductor by a third gap distance different from the first gap distance and the second gap distance.

The antenna device may be configured to operate at a first resonant frequency and a second resonant frequency different from the first resonant frequency. The first gap distance may correspond to the first resonant frequency. The second gap distance may correspond to the second resonant frequency.

The first gap distance may be configured to tune an impedance of the antenna device at the first resonant frequency. The second gap distance may be configured to tune the impedance of the antenna device at the second resonant frequency.

The first gap distance may be configured to provide coupling at the first resonant frequency between the first conductor and the second conductor across the first region of the gap. The second gap distance may be configured to provide coupling at the second resonant frequency between the first conductor and the second conductor across the second region of the gap.

The dielectric support may comprise a plurality of planar surfaces. At least two regions from among the first region, the second region, and the third region of the gap may be disposed, at least in part, on a respective at least two planar surfaces of the plurality of planar surfaces of the dielectric support.

The first region, the second region, and the third region of the gap may be disposed, at least in part, on respective first, second, and third planar surfaces of the plurality of planar surfaces of the dielectric support.

The antenna device may further comprise a third conductor disposed on the dielectric support and spaced from the first conductor by a second gap. The second gap may comprise a fourth region in which the first conductor is spaced from the third conductor are spaced by a fourth gap distance that is different from at least one of the first gap distance, the second gap distance, and the third gap distance.

The second gap may further comprise a fifth region in which the first conductor is spaced from the third conductor by a fifth gap distance that is different from the fourth gap distance.

The antenna device may be further configured to operate at a third resonant frequency different from the first resonant frequency and the second resonant frequency. The fourth gap distance may correspond to the second resonant frequency. The fifth gap distance may correspond to the third resonant frequency.

The fourth gap distance may be configured to tune an impedance of the antenna device at the second resonant frequency. The fifth gap distance may be configured to tune the impedance of the antenna device at the third resonant frequency.

The fourth gap distance may be configured to provide coupling at the second resonant frequency between the first conductor and the third conductor across the fourth region of the second gap. The fifth gap distance may be configured to provide coupling at the third resonant frequency between the first conductor and the third conductor across the fifth region of the second gap.

The antenna device may be configured as a standing wave antenna device.

The first conductor may comprise at least one member selected from the group consisting of: a monopole; an inverted-F; a dipole; and a patch.

The first conductor and the second conductor may be configured to form a coupled line.

The antenna device may be configured to operate in: a first frequency band contained in a first frequency range from 699 MHz to 1710 MHz; a second frequency band contained in a second frequency range from 1710 MHz to 2400 MHz; and a third frequency band contained in a third frequency range from 2400 MHz to 3 GHz.

The third frequency band may be contained in a frequency range from 2483 MHz to 2690 MHz.

A system may comprise: a housing; the antenna device disposed within the housing; and a circuit board disposed within the housing and comprising circuitry coupled to the antenna device to transmit and/or receive signals via the antenna device, the circuitry including: a feed port coupled to the signal feed terminal of the first conductor; and a reference port coupled to reference feed terminal of the second conductor.

The circuit board may further comprise a ground plane. The reference port may be coupled to the ground plane.

According to another broad aspect, the present disclosure describes an antenna device, comprising: a dielectric support; a first conductor disposed on the dielectric support, the first conductor comprising: a signal feed terminal; a first signal portion electrically connected to the signal feed terminal and configured to have a first electromagnetic field amplitude at a first resonant frequency when the signal feed terminal is driven at the first resonant frequency; and a second signal portion electrically connected to the signal feed terminal and configured to have a second electromagnetic field amplitude at the first resonant frequency when the signal feed terminal is driven at the first resonant frequency, wherein the first electromagnetic field amplitude is larger than the second electromagnetic field amplitude; and a second conductor disposed on the dielectric support and comprising: a reference feed terminal; a first reference portion electrically connected to the reference feed terminal and spaced from the first signal portion by a first gap distance, the first gap distance configured to provide a first amount of coupling between the first signal portion and the first reference portion at the first resonant frequency; and a second reference portion electrically connected to the reference feed terminal, spaced from the second signal portion by a second gap distance greater than the first gap distance, and configured to provide a second amount of coupling between the second signal portion and the second reference portion at the first resonant frequency, the first amount of coupling being larger than the second amount of coupling.

The second signal portion may be coupled between the signal feed terminal and the first signal portion. The second reference portion may be coupled between the reference feed terminal and the first reference portion.

The first gap distance may be configured to tune an impedance of the antenna device at the first resonant frequency. The second gap distance may be configured to tune the impedance of the antenna device at a second resonant frequency different from the first resonant frequency.

The first conductor may further comprise a third signal portion electrically connected to the signal feed terminal. The second conductor may further comprise a third reference portion electrically connected to the reference feed terminal and spaced from the third signal portion by a third gap distance smaller than the second gap distance and configured to provide a third amount of coupling between the third signal portion and the third reference portion at the first resonant frequency, the third amount of coupling being larger than the second amount of coupling.

The second signal portion may be coupled between the first signal portion and the third signal portion. The second reference portion may be coupled between the first reference portion and the third reference portion.

The third signal portion may be configured to have a third electromagnetic field amplitude at the first resonant frequency, that is larger than the second electromagnetic field amplitude, when the signal feed terminal is driven at the first resonant frequency.

The antenna device may further comprise a third conductor disposed on the dielectric support and comprising a second reference feed terminal and a fourth reference portion electrically coupled to the second reference feed terminal separated from the third signal portion by a fourth gap distance. The fourth gap distance may be configured to provide a fourth amount of coupling between the third signal portion and the fourth reference portion at the first resonant frequency that is less than the third amount of coupling. The fourth gap distance may be configured to provide a fifth amount of coupling between the third signal portion and the fourth reference portion at a third resonant frequency different from the first resonant frequency and the second resonant frequency. The third gap distance may be configured to provide a sixth amount of coupling between the third signal portion and the third reference portion at the third resonant frequency that is less than the fifth amount of coupling.

The antenna device may be configured as a standing wave antenna device.

The first conductor may comprise at least one member selected from the group consisting of: a monopole; an inverted-F; a dipole; and a patch.

The first conductor and the second conductor may be configured to form a coupled line.

The antenna device may be configured to operate in: a first frequency band contained in a first frequency range from 699 MHz to 1710 MHz; a second frequency band contained in a second frequency range from 1710 MHz to 2400 MHz; and a third frequency band contained in a third frequency range from 2400 MHz to 3 GHz.

The third frequency band may be contained in a frequency range from 2483 MHz to 2690 MHz.

A system may comprise: a housing; the antenna device disposed within the housing; and a circuit board disposed within the housing and comprising circuitry coupled to the antenna device to transmit and/or receive signals via the antenna device, the circuitry including: a feed port coupled to the signal feed terminal of the first conductor; and a reference port coupled to reference feed terminal of the second conductor.

According to another broad aspect, the present disclosure describes an antenna device, comprising: a dielectric support; a first conductor disposed on the dielectric support, the first conductor comprising: a signal feed terminal; a first signal portion electrically connected to the signal feed terminal, the first signal portion being elongated in a first direction and comprising a first conductor termination in the first direction; and a second signal portion elongated in the first direction, the second signal portion terminating in the first direction at the first signal portion; and a second conductor disposed on the dielectric support and comprising: a reference feed terminal; a first reference portion electrically connected to the reference feed terminal, the first reference portion being elongated in the first direction spaced from the first signal portion in a second direction perpendicular to the first direction by a first gap distance, and comprising a second conductor termination in the first direction, the first conductor termination of the first signal portion being offset in the first direction from the second conductor termination of the first reference portion; and a second reference portion elongated in the first direction and spaced from the second signal portion in the second direction by a second gap distance that is greater than the first gap distance, the second reference portion terminating in the first direction at the first reference portion.

The antenna device may be configured to operate at a first resonant frequency and a second resonant frequency different from the first resonant frequency. The first gap distance may correspond to the first resonant frequency. The second gap distance may correspond to a second resonant frequency different from the first resonant frequency.

The first gap distance may be configured to tune an impedance of the antenna device at the first resonant frequency. The second gap distance may be configured to tune the impedance of the antenna device at the second resonant frequency.

The first gap distance may be configured to provide coupling at the first resonant frequency between the first conductor and the second conductor. The second gap distance may be configured to provide coupling at the second resonant frequency between the first conductor and the second conductor.

The first signal portion may be configured to have a first electromagnetic field amplitude at a first resonant frequency when the signal feed terminal is driven at the first resonant frequency. The second signal portion may be configured to have a second electromagnetic field amplitude at the first resonant frequency when the signal feed terminal is driven at the first resonant frequency. The first electromagnetic field amplitude may be larger than the second electromagnetic field amplitude. The first gap distance may be configured to provide a first amount of coupling between the first signal portion and the first reference portion at the first resonant frequency. The second gap distance may be configured to provide a second amount of coupling between the second signal portion and the second reference portion at the first resonant frequency, the first amount of coupling being larger than the second amount of coupling.

The first conductor may further comprise a third signal portion coupled between the second signal portion and the signal feed terminal. The second conductor may further comprise a third reference portion coupled between the second reference portion and the reference feed terminal and spaced from the third signal portion by a third gap distance different from the first gap distance and the second gap distance.

The dielectric support may comprise a plurality of planar surfaces. The first signal portion and the second signal portion may be disposed, at least in part, on a first planar surface of the plurality of planar surfaces. The first reference portion and the second reference portion of the second conductor may be disposed, at least in part, on a second planar surface of the plurality of planar surfaces.

The antenna device may further comprise a third conductor disposed on the dielectric support and spaced from the first conductor in a third direction perpendicular to the first direction, with at least a portion of the first conductor positioned between the second conductor and the third conductor in the third direction, and the third conductor having a second reference feed terminal.

The antenna device may be configured as a standing wave antenna device.

The first conductor may comprise at least one member selected from the group consisting of: a monopole; an inverted-F; a dipole; and a patch.

The first conductor and the second conductor may be configured to form a coupled line.

The antenna device may be configured to operate in: a first frequency band contained in a first frequency range from 699 MHz to 1710 MHz; a second frequency band contained in a second frequency range from 1710 MHz to 2400 MHz; and a third frequency band contained in a third frequency range from 2400 MHz to 3 GHz.

The third frequency band may be contained in a frequency range from 2483 MHz to 2690 MHz.

A system may comprise: a housing; the antenna device disposed within the housing; and a circuit board disposed within the housing and comprising circuitry coupled to the antenna device to transmit and/or receive signals via the antenna device, the circuitry including: a feed port coupled to the signal feed terminal of the first conductor; and a reference port coupled to the reference feed terminal of the second conductor.

The circuit board may further comprise a ground plane. The reference port may be coupled to the ground plane.

BRIEF DESCRIPTION OF DRAWINGS

Exemplary non-limiting embodiments are described with reference to the accompanying drawings in which.

DETAILED DESCRIPTION

Figure 1A:
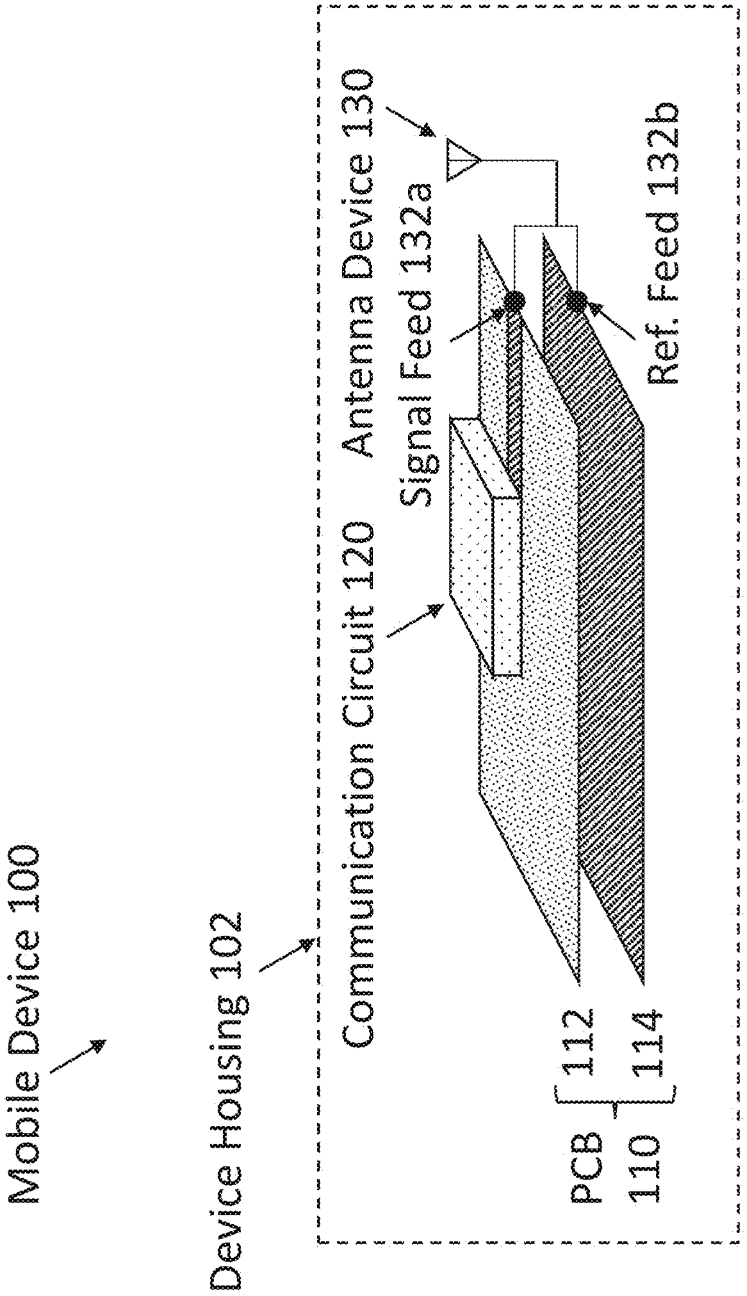
FIG. 1A is a perspective view of an example mobile device including a communication circuit and an antenna device disposed within a device housing.

The Inventor has recognized that, as mobile devices are expected to operate with larger frequency bandwidths (e.g., within the same or across multiple radio technologies), it becomes more challenging to implement antennas without excessive complexity or space consumption in the device. A conventional challenge in designing an antenna to have a large bandwidth is that a physical layout of the antenna that achieves desired performance in one part of the desired band (e.g., low band edge) may not achieve the desired performance in another part of the desired band (e.g., mid-band, high band edge). Changing the physical layout of the antenna to improve performance in one part of the desired band typically impacts, and often degrades, performance in another part of the desired band. As the desired bandwidth becomes large, such as spanning several resonant frequencies, tuning the physical layout of an antenna to achieve desired performance across the whole band becomes increasingly difficult.

An alternative way of increasing the bandwidth in a mobile device is to add antennas to the device dedicated to different segments of the desired bandwidth. However, each antenna consumes space in the device, and with every antenna added to the device, there is potential for increased interference between antennas that are close in operating frequency (e.g., high band cellular and Bluetooth). As another alternative, one or more reconfigurable antennas (e.g., having adjustable feeds) may be controlled to cover various parts of a desired frequency bandwidth, depending on which part is needed at a given time. However, with increasing frequency bandwidth, the number of configurations (e.g., selectable inductors for feeding an antenna) becomes challenging to manage.

The Inventor has found that it would be advantageous to implement an antenna capable of operating over a large frequency bandwidth, without necessarily relying on reconfigurability.

Accordingly, the Inventor has developed antenna configurations that, in some embodiments, may be advantageously tuned to achieve desired electromagnetic performance over multiple resonant frequencies by providing control, in the design process, over some or all of the desired resonant frequencies. Such antenna configurations, in some embodiments, may be configured to achieve a large frequency bandwidth in a static physical layout, without necessarily resorting to a reconfigurable feed path.

In some embodiments, an antenna device may include first and second conductors (e.g., signal and reference conductors) disposed on a dielectric support, with a gap spacing the first and second conductors apart, and the gap having multiple regions of different gap distance between the first and second conductors. For example, the gap may have at least first, second, and third regions in which the first and second conductors are spaced from one another by respective first, second, and third gap distances that are each different from one another. In some embodiments, by configuring the gap between the first and second conductors in this manner, gap distances of the regions may be tuned provide desirable (e.g., different) amounts of coupling at different resonant frequencies, allowing the electromagnetic properties (e.g., impedance) of the antenna device to be controlled to desirable levels at some or all resonant frequencies individually.

In some embodiments, an antenna device may include first and second conductors (e.g., signal and reference conductors) disposed on a dielectric support, with portions of the first and second conductors being configured to have different electromagnetic field amplitudes at the same resonant frequency and spaced from one another to achieve different amounts of coupling between the conductors at that resonant frequency. For example, the first conductor may have a first portion and a second portion, with the first portion having a larger electromagnetic field amplitude at the resonant frequency, and the second conductor may have a first portion and a second portion, with the first portions of the conductors closer to one another in gap distance than the second portions, such that the first portions achieve a larger amount of coupling than the second portions. In some embodiments, positioning a portion of the first conductor closer to the second conductor where the electromagnetic field amplitude is higher at a given resonant frequency achieves advantageous coupling to individually tune electrical properties of the antenna device at the resonant frequency.

In some embodiments, an antenna device may include first and second conductors (e.g., signal and reference conductors) disposed on a dielectric support, with portions of the first and second conductors spaced apart by different gap distances, the second conductor terminating (in a direction of elongation) before the first conductor terminates, and the more closely coupled portions of the first and second conductors being closer to the terminations. For example, the first conductor may have first and second portions, with the first portion having the first conductor termination, and the second conductor may have first and second portions, with the first portion having the second conductor termination, and the first portions may be more closely spaced than the second portions. In some embodiments, closely spaced portions and offset terminations of the first and second conductors may facilitate advantageous coupling between the conductors at the closely spaced portions (e.g., to tune a resonant frequency of the antenna device) without causing excessive coupling at the offset conductor termination, where such coupling might otherwise disadvantageously impact performance of the antenna device.

In some cases, antennas described herein may be suitable for use as the only antenna in a device, whereas in other cases, such antennas may be suitable for use as the only antenna within a particular radio technology (e.g., cellular)

in a device. It should be appreciated, however, that antenna design techniques described herein are also suitable for use in devices having many antennas, including multiple antennas of the same radio technology, antennas having polarization diversity with respect to one another, and/or including reconfigurable antennas. For instance, a reconfigurable antenna may be simplified in design (e.g., needing fewer selectable inductors in the feed path) using antenna design techniques described herein.

FIG. 1A is a perspective view of an example mobile device 100 including a communication circuit 120 and an antenna device 130 disposed within a device housing 102.

In some embodiments, mobile device 100 may be configured for wireless data communication. For example, mobile device 100 may be configured as a mobile telephone configured for data communication over a cellular network. Alternatively or additionally, mobile device 100 may be configured as a fleet telematics device. For example, mobile device 100 may include a global navigational satellite system (GNSS) receiver configured to receive GNSS signals (e.g., GPS, GLONASS, etc.) and therefrom determine coordinates of a location of mobile device 100, and/or mobile device 100 may be configured to connect to a computer onboard a vehicle to obtain vehicle operating condition data and/or sensory data from the vehicle. Any or all such information may be transmitted wirelessly from mobile device 100 over cellular, Wi-Fi® (e.g., 802.11a/b/g/n/ac/ax or later), Bluetooth® (e.g., 802.15.1 or later), and/or similar communication channels.

In some embodiments, device housing 102 may be configured to protect internal components of mobile device 100 disposed therein. For example, device housing 102 may include metal and/or hard plastic. In some embodiments, components of mobile device 100 may be located within a cavity of device housing 102. According to various embodiments, device housing 102 may include one or multiple interconnected housing portions. In some embodiments, having one or more antenna devices within device housing 102 may facilitate keeping the form factor of mobile device 100. At the same time, in some embodiments, antenna devices and associated techniques described herein may be applied to external antennas, such as an antenna having at least a portion incorporated into and/or exposed from within the device housing, such as an antenna making at least partial use of a device bezel.

In some embodiments, components of mobile device 100 may be located on one or more circuit boards. For example, as shown in FIG. 1A, device housing 102 has therein a printed circuit board (PCB) 110 supporting communication circuit 120 and connected to antenna device 130. In FIG. 1A, PCB 110 includes a first layer 112 and a second layer 114. In some embodiments, each layer 112, 114 may include conductive material. For example, in FIG. 1A, substantially all of layer 114 has conductive material, which may be configured to form a ground plane for mobile device 100. For instance, conductive material shown in layer 114 in FIG. 1A may serve as a ground reference for communication circuit 120 and antenna device 130, such as by connecting to reference feed terminal 132*b*. In some embodiments, PCB 110 may further include insulative material. For example, layer 112 is shown in FIG. 1A including insulative material and a strip of conductive material connecting communication circuit 120 to signal feed 132*a*. And, while not shown in FIG. 1A, in some embodiments, layers 112 and 114 may be separated by a layer of insulative material (e.g., fiberglass). While only two layers 112 and 114 are shown in PCB 110 in FIG. 1A, a PCB included in mobile device 100 may have any number of layers.

In some embodiments, communication circuit 120 may be configured to operate antenna device 130 to transmit and/or receive data wirelessly. For example, communication circuit 120 may include data modulation and transmission circuitry, such as a transmit mixer and power amplifier. Alternatively or additionally, communication circuit 120 may include data demodulation and reception circuitry, such as a low noise amplifier and receive mixer. For instance, communication circuit 120 may be implemented using a packaged modulator-demodulator (modem) integrated circuit, which may be mounted on PCB 110 for connection to antenna device 130.

In some embodiments, antenna device 130 may be configured for single-ended signal feeding with reference to a ground plane of mobile device 100. For example, as shown in FIG. 1A, antenna device 130 has signal feed terminal 132*a* coupled to communication circuit 120, which may have a feed port configured to receive and/or provide a signal from and/or antenna device 130. Also shown in FIG. 1A, antenna device 130 has reference feed terminal 132*b* coupled to conductive material of layer 114 of PCB 110, which may be configured as a ground plane. In some embodiments, communication circuit 120 may have a reference port coupled to directly to reference feed terminal 132*b*, and/or the reference port may be coupled to reference feed terminal 132*b* via conductive material of layer 114 (e.g., through a ground connection of communication circuit 120).

In some embodiments, mobile device 100 may include multiple antennas 130. For example, one antenna 130 may be configured for operation in cellular frequency bands, and another antenna 130 may be configured for operation in Wi-Fi® (e.g., 2.4 GHz, 5 GHz, and/or 6 GHz) and/or Bluetooth® (e.g., 2.4 GHz) frequency bands. In the same or another example, an antenna 130 may be configured for operation in GNSS (e.g., GPS, GLONASS) (e.g., 1.2 GHz, 1.5 GHz, and/or 1.6 GHz) frequency bands. Alternatively or additionally, multiple antennas 130 may be configured for the same connectivity mode, such as multiple antennas 130 configured for operation in the same and/or different cellular frequency bands, Wi-Fi® and/or Bluetooth®, and/or GNSS frequency bands. For instance, multiple antennas 130 may be configured to operation in at least some same cellular frequency bands to achieve polarization diversity in mobile device 100.

In some embodiments, antenna device 130 may be configured to operate in one or more cellular frequency bands. For example, antenna device 130 may be configured to operate in a first frequency band contained in a first frequency range from 699 MHz to 1710 MHz, a second frequency band contained in a second frequency range from 1710 MHz to 2400 MHz, and a third frequency band contained in a third frequency range from 2400 MHz to 3 GHz, and/or from 2483 MHz to 2700 MHz (e.g., 2483 MHz to 2690 MHz). For instance, the first frequency band may be from 699 MHz to 960 MHz, the second frequency band may be from 1710 GHz to 2155 MHz, and the third frequency band may be from 2500 MHz to 2700 MHz.

While not shown in FIG. 1A, in some embodiments, device housing 102 may further support one or more user interface devices such as a touchscreen, speaker, keyboard, mouse, and/or buttons for a user to engage to input information to and/or receive information from mobile device 100. In some embodiments in which mobile device 100 is configured as a fleet telematics device, mobile device 100 may include few or no user interface devices. For instance, a fleet telematics device may be configured to obtain information (e.g., GNSS location and/or vehicle condition data) and transmit the information wirelessly over a network without user interaction, though in other cases, a fleet telematics device may be configured alternatively or additionally for user interaction.

In some embodiments, mobile device 100 may further include a processor (e.g., on PCB 110). In some embodiments, mobile device 100 may further include a battery, though in some embodiments, mobile device 100 may be configured to operate only using power from an external power source.

Figure 1B:
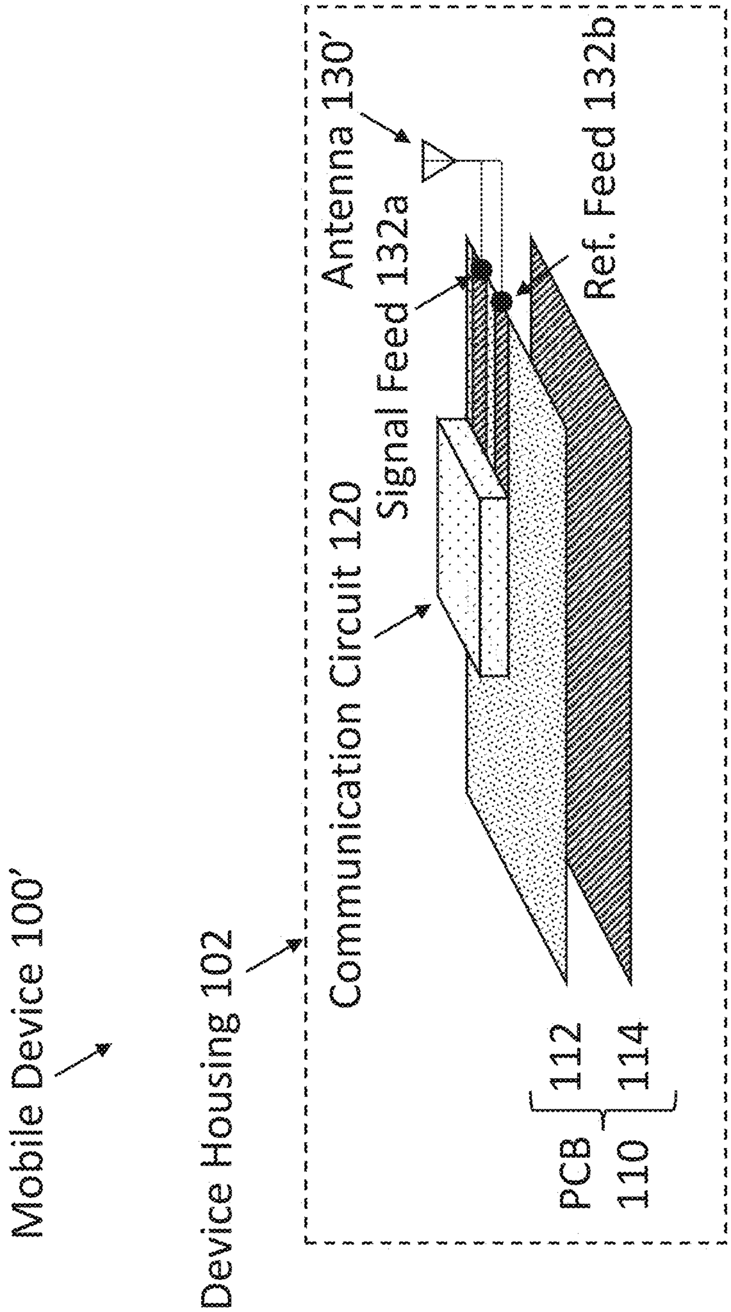
FIG. 1B is a perspective view of an example mobile device including a communication circuit and an alternative antenna device within a device housing.

FIG. 1B is a perspective view of an example mobile device 100' including a communication circuit 120 and an alternative antenna device 130' within a device housing 102.

In some embodiments, mobile device 100' may be configured as described herein for mobile device 100, except that antenna device 130' may be configured for differential signal feeding. For example, as shown in FIG. 1B, antenna device 130' has signal feed terminal 132*a* and reference feed terminal 132*b* both coupled to communication circuit 120, which may have a feed port and a reference port configured to receive and/or provide differential signal components from and/or to respective signal and reference feed terminals 132*a* and 132*b*.

Figure 1C:
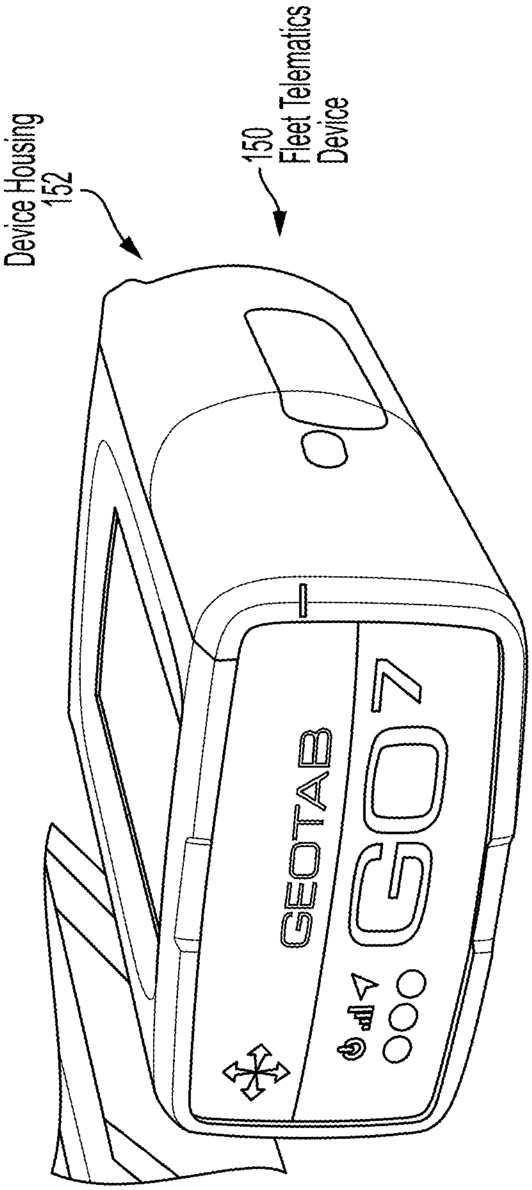
FIG. 1C is a perspective view of an example fleet telematics device.
Figure 1D:
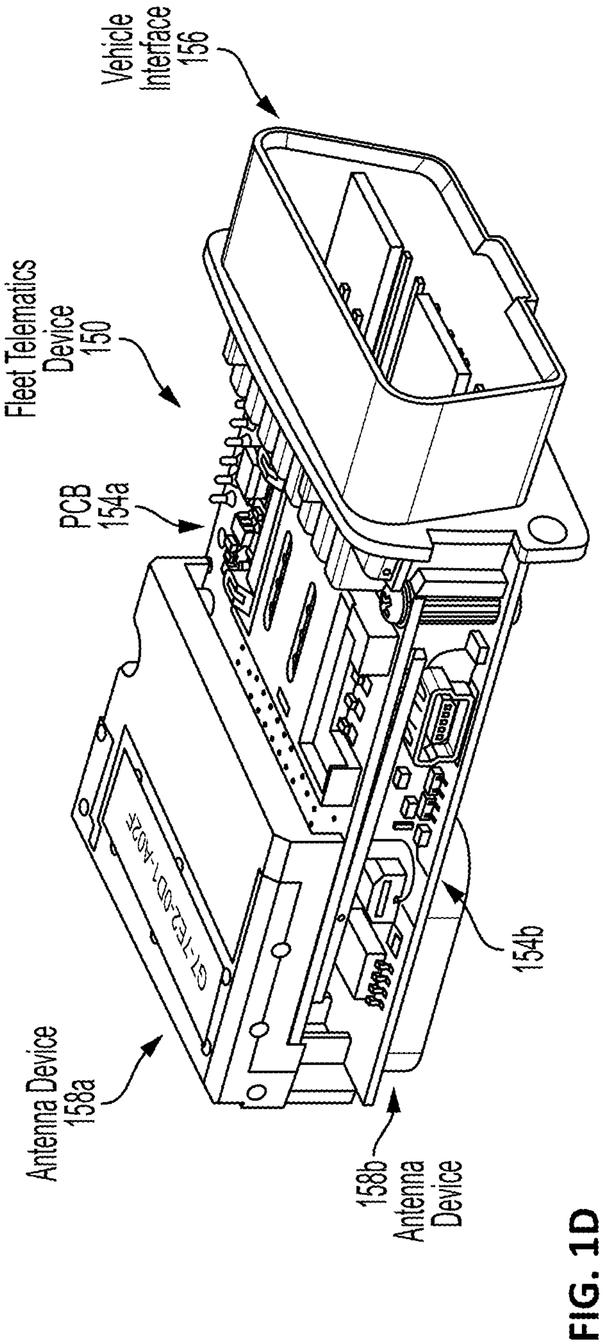
FIG. 1D is a perspective view of the fleet telematics device of FIG. 1C with the device housing removed.

FIG. 1C is a perspective view of an example fleet telematics device 150. FIG. 1D is a perspective view of fleet telematics device 150 with device housing 152 removed.

In some embodiments, fleet telematics device 150 may be configured as described herein for mobile device 100 and/or 100'. For example, as shown in FIG. 1C, fleet telematics device 150 has a device housing 152 with components of fleet telematics device disposed therein. In the illustrated example, device housing 152 includes hard plastic. Also shown in FIG. 1D, fleet telematics device 150 further includes a pair of PCBs 154*a* and 154*b*, a vehicle interface 156, and a pair of antenna devices 158*a* and 158*b*.

In some embodiments, PCBs 154*a* and 154*b* may be configured to support circuitry such as a communication circuit (e.g., 120) coupled to each antenna device 158*a* and 158*b*. For example, a first communication circuit may be disposed on first PCB 154*a* and coupled to antenna device 158*a* for operation in cellular frequency bands, and a second communication circuit may be disposed on second PCB 154*b* and coupled to antenna device 158*b* for operation in GNSS frequency bands.

In some embodiments, vehicle interface 156 may be configured to obtain vehicle condition data from a vehicle. For example, fleet telematics device 150 may be configured to communicate some or all vehicle condition data obtained from the vehicle using antenna device 158*a* (e.g., over a cellular network). In some embodiments, vehicle interface 156 may be alternatively or additionally configured to obtain power from a vehicle for operating electronics of fleet telematics device 150, such as to operate communication circuits and/or antenna devices. In the illustrated embodiment, vehicle interface 156 includes a second-generation on-board diagnostics (OBD-II) port, though other vehicle interfaces (e.g., EOBD) may be alternatively or additionally used.

In some embodiments, fleet telematics device 150 may further include a processor (e.g., microprocessor operatively coupled to memory) configured to monitor and/or process vehicle condition data obtained from a vehicle. For example, according to various embodiments, vehicle condition data may include any or each of: vehicle information number, current odometer reading, current speed, engine rotations per minute (RPM), battery voltage, engine coolant temperature, engine coolant level, accelerator pedal position, brake pedal position, manufacturer-specific vehicle diagnostic trouble codes (DTCs), tire pressure, oil level, airbag status, seatbelt indication, emission control data, engine temperature, intake manifold pressure, transmission data, braking information, and/or fuel level. In some embodiments, the processor may be configured to monitor at least some vehicle condition data obtained from a vehicle and select information for transmitting wirelessly, such as information triggering an alert regarding the status of the vehicle. Alternatively or additionally, the processor may be configured to determine a location of the vehicle (e.g., using a GNSS receiver coupled, e.g., to antenna device 158*b*) and incorporate the location into information transmitted wirelessly, such as to associate transmitted vehicle condition data with a location of the vehicle.

In some embodiments, fleet telematics device 150 may alternatively or additionally include a sensor, such as an accelerometer, thermometer, and/or altimeter, which may be configured to gather alternative or additional information that may be transmitted wirelessly and/or used to determine whether to transmit the same or other information (e.g., vehicle condition data) wirelessly.

Figure 2:
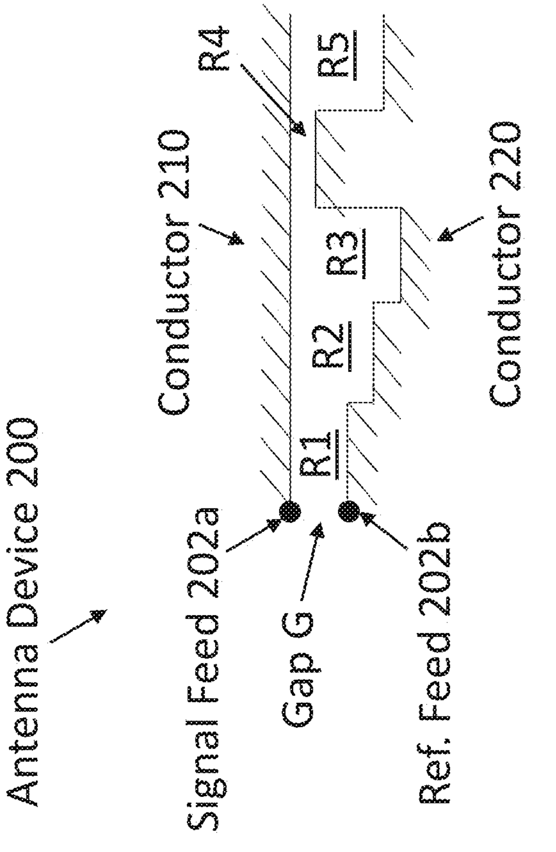
FIG. 2 is a schematic view of an example antenna device having multiple conductors spaced apart by a gap having regions of different gap distance.

FIG. 2 is a schematic view of an example antenna device 200 having multiple conductors 210, 220 spaced apart by a gap having regions of different gap distance.

In some embodiments, antenna device 200 may be implemented in mobile device 100 and/or 100' as antenna device 130 and/or 130', respectively.

In some embodiments, antenna device 200 may include a first conductor 210 having a signal feed terminal 202*a* and a second conductor 220 having a reference feed terminal 202*b*. For example, signal feed terminal 202*a* may be configured to receive and/or provide a single-ended signal from and/or to a communication circuit (e.g., 120) and reference feed terminal 202*b* may be configured for coupling to a ground reference. Alternatively, signal feed terminal 202*a* and reference feed terminal 202*b* may be configured to receive and/or provide respective differential signal components of a differential signal from and/or to a communication circuit. In some embodiments, first and second conductors 210 and 220 may include conductive material plated onto a dielectric support. For instance, conductive material may be plated onto a dielectric support (e.g., molded plastic) using a laser direct structuring (LDS) process. Alternatively or additionally, conductive material (e.g., copper trace) may be plated onto a dielectric support (e.g., circuit board substrate, e.g., FR4) using a circuit board printing process. In some embodiments, a dielectric support, with conductive material plated thereon, may be held within a device housing (e.g., 102) of a mobile device, and with signal feed terminal 202*a* and reference feed terminal 202*b* connected to communication circuitry (e.g., 120) and/or a ground plane of the mobile device to establish electrical connection with antenna device 200.

In some embodiments, first and second conductors 210 and 220 may be spaced apart by a gap. For example, as shown in FIG. 2, a gap G is disposed between first and second conductors 210 and 220. For instance, gap G may include a region of a dielectric support having no conductive material connected to either of first and second conductors 210 and 220, such as a region without any conductive plating. It should be appreciated that gap G need not be filled only with material of the dielectric support, in such embodiments, as the gap may be alternatively or additionally filled with air in some cases. In some embodiments, first conductor 210 and second conductor 220 may be configured to form a coupled line, such as due to coupling between first conductor 210 and second conductor 220 across gap G. For example, first conductor 210 and second conductor 220 may be electrically separated (e.g., by gap G) at some or all frequencies of operation. For instance, first conductor 210 and second conductor 220 may not be conductively coupled to one another at any point.

In some embodiments, the gap spacing apart first and second conductors 210 and 220 may have multiple regions of different gap distances. For example, in FIG. 2, gap G includes a first region R1, in which first conductor 210 is spaced from second conductor 220 by a first gap distance, and a second region R2, in which first conductor 210 is spaced from second conductor 220 by a second gap distance different from the first gap distance. For instance, in FIG. 2, the second gap distance of second region R2 is larger than the first gap distance of first region R1, though in other cases, the first gap distance may be larger. Also shown in FIG. 2, gap G includes a third region R3, in which first conductor 210 is spaced from second conductor 220 by a third gap distance different from the first and second gap distances. For instance, in FIG. 2, the third gap distance is larger than each of the first and second gap distances, though in other cases one of the first and second gap distances may be largest of the three gap distances.

In some embodiments, regions of gap G may be configured to tune performance of antenna device 200 over multiple resonant frequencies. For example, antenna device 200 may be configured to operate at a first resonant frequency and a second resonant frequency different from the first resonant frequency. For instance, the first resonant frequency may be a cellular low band frequency (e.g., 700 MHz) and the second resonant frequency may be a cellular mid band frequency (e.g., 1700 MHz), though other resonant frequencies may be used, such as cellular mid band and cellular high band (e.g., 2700 MHz), and/or Wi-Fi® low band (e.g., 2400 MHz) and high band(s) (e.g., 5000 and/or 6000 MHz).

In some embodiments, the first gap distance of first region R1 may correspond to the first resonant frequency and the second gap distance of second region R2 may correspond to the second resonant frequency. For instance, the first gap distance of first region R1 may be configured to tune an impedance of antenna device 200 (e.g., as experienced by signals propagating therein) at the first resonant frequency and the second gap distance of second region R2 may be configured to tune the impedance of antenna device 200 at the second resonant frequency. In some cases (e.g., depending on relative positions of the gap regions R1 and R2), the first gap distance may have a more significant impact on impedance at the first resonant frequency than the second gap distance, and/or the second gap distance may have a more significant impact on impedance at the second resonant frequency than the first gap distance.

In some embodiments, regions of gap G may be configured to tune performance of antenna device 200 by controlling coupling at multiple resonant frequencies between first and second conductors 210 and 220 across the regions of gap G. For example, the first gap distance of first region R1 may be configured to provide coupling between first and second conductors 210 and 220 at a first resonant frequency across first region R1 of gap G and the second gap distance of second region R2 may be configured to provide coupling between first and second conductors 210 and 220 at a second resonant frequency across second region R2 of gap G. For instance, to tune the impedance of antenna device 200, the first gap distance of first region R1 may be set to a value at which capacitive coupling between first conductor 210 and second conductor 220 across first region R1 results in a desired impedance of antenna device 200 at the first resonant frequency, and the second gap distance of second region R2 may be set to a value at which capacitive coupling between first conductor 210 and second conductor 220 across second region R2 results in a desired impedance of antenna device 200 at the second resonant frequency. In some embodiments, the gap distances of first and second regions R1 and R2 may thereby provide a mechanism for individually tuning impedances of antenna device 200 at multiple resonant frequencies.

In some embodiments, third region R3 may be configured to tune performance of antenna device 200 at the first and/or second resonant frequency. For example, the third gap distance of third region R3 may correspond to the first and/or second resonant frequency. For instance, the third gap distance may be configured to tune the impedance of antenna device 200 at the first and/or second resonant frequency, such as by providing coupling at the first and/or second resonant frequency between first conductor 210 and second conductor 220 across third region R3. In some embodiments, as a further part of tuning the impedance of antenna device 200, the third gap distance of third region R3 may be set to a value at which capacitive coupling between first conductor 210 and second conductor 220 across third region R3 results in a desired impedance of antenna device 200 at the first and/or second resonant frequency. In some cases, having several (e.g., three or more) gap regions with different distances between first conductor 210 and second conductor 220 may provide several degrees of freedom with which to tune performance (e.g., impedance) of antenna device 200 across multiple resonant frequencies.

In some embodiments, the gap spacing apart first and second conductors 210 and 220 may have more than three regions. For example, as shown in FIG. 2, gap G further includes a fourth region R4, in which first conductor 210 is spaced from second conductor 220 by a fourth gap distance different from the first, second, and third gap distances, and a fifth region R5, in which first conductor 210 is spaced from second conductor 220 by a fifth gap distance different from the first, second, third, and fourth gap distances. In some embodiments, some or all regions of gap G may provide gap distances tunable to provide a desired impedance of antenna device 200 across respective resonant frequencies.

In some embodiments, gap regions of gap G may provide constant gap distances, such as shown in FIG. 2. In other embodiments, a gap region may provide a varying gap distance. For instance, while the transition between gap region R1 and R2 in FIG. 2 is shown as a step, the transition (and/or the transition between any or all other gap region(s) shown in FIG. 2) may alternatively be tapered so as to provide an additional gap region of varying gap distance.

Figures 3A, 3B:
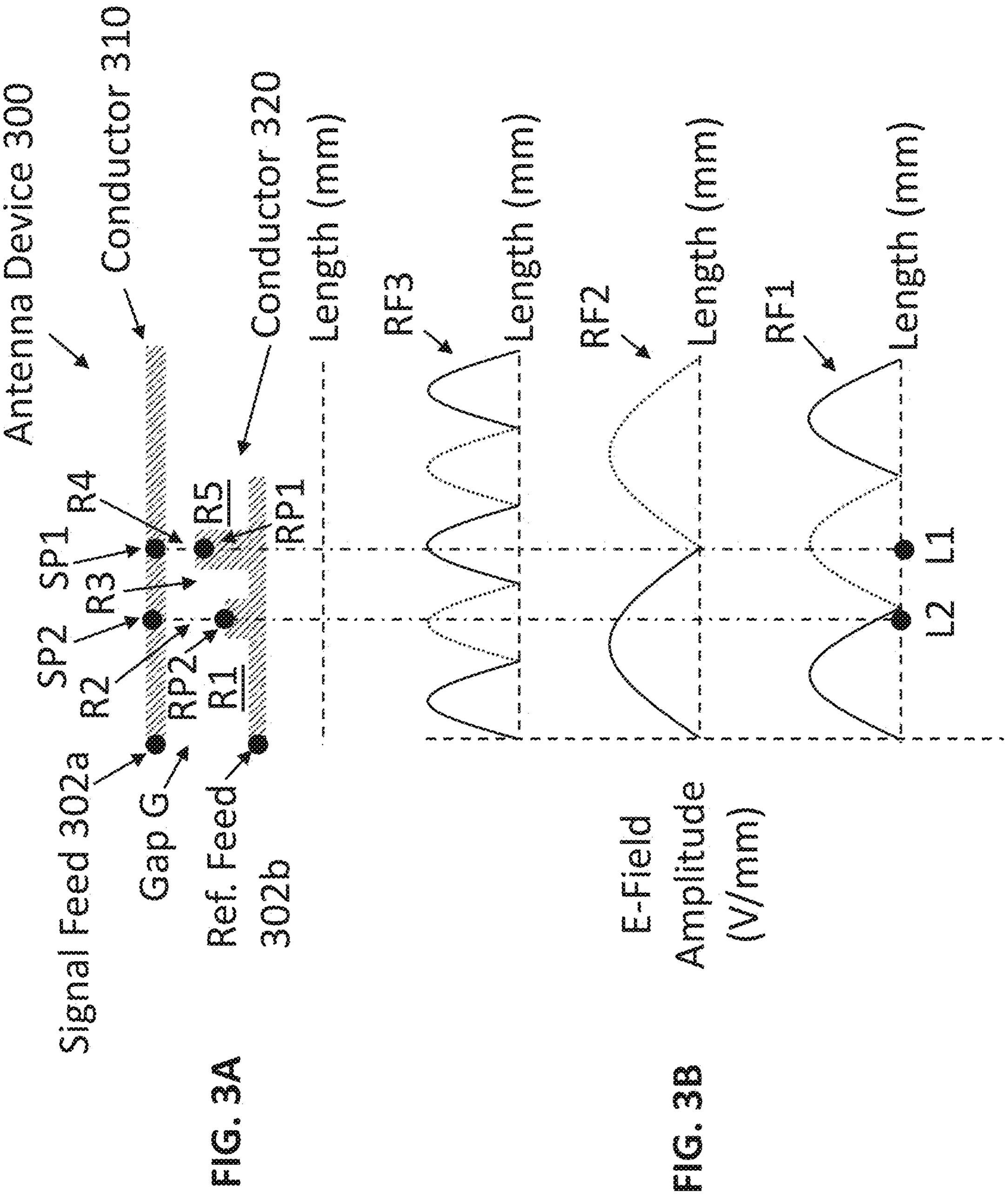
FIG. 3A is a schematic view of an alternative antenna device having multiple conductors configured to closely couple energy at a portion having an electromagnetic field amplitude peak.
FIG. 3B is a graph illustrating electromagnetic field amplitude along the length of conductor of the antenna device of FIG. 3A at three resonant frequencies.

FIG. 3A is a schematic view of an alternative antenna device 300 having multiple conductors 310, 320 configured to closely couple energy at a portion having an electric field amplitude peak. FIG. 3B is a graph illustrating electric field amplitude along the length of conductor 310 of antenna device 300 at three resonant frequencies RF1, RF2, and RF3.

In some embodiments, antenna device 300 may be configured as described herein for antenna device 200, such as including first and second conductors 310 and 320, and with first conductor 310 including a signal feed terminal 302*a* and second conductor 320 including a reference feed terminal 302*b*. For example, conductors 310 and 320 may be disposed on a dielectric support as described herein for antenna device 200. In FIG. 3A, first and second conductors 310 and 320 are separated by a gap G having a first region R1, second region R2, third region R3, and fourth region R4, each separating first and second conductors 310 and 320 by different gap distances, similar to as described for antenna device 200. It should be appreciated, however, that fewer (or more) regions and/or fewer (or more) different gap distances may be implemented in antenna device 300 than shown in FIG. 3A. In some embodiments, first conductor 310 and second conductor 320 may be configured to form a coupled line.

In some embodiments, first and second conductors 310 and 320 may each have multiple portions connected to respective feed terminals 302*a* and 302*b*. For example, in FIG. 3A, first conductor 310 is shown including a first signal portion SP1 and a second signal portion SP2 and second conductor 320 is shown including a first reference portion RP1 and a second reference portion RP2. For instance, first and second signal portions SP1 and SP2 may be conductively coupled to signal feed terminal 302*a* via conductive material of first conductor 310 and first and second reference portions RP1 and RP2 may be conductively coupled to reference feed terminal 302*b* via conductive material of second conductor 320. In the illustrated embodiment, second signal portion SP2 is shown coupled between signal feed terminal 302*a* and first signal portion SP1, and second reference portion RP2 is shown coupled between reference feed terminal 302*b* and first reference portion RP1. In other embodiments, the first signal portion may be coupled between the second signal portion and the signal feed terminal, and/or the first reference portion may be coupled between the second reference portion and the reference feed terminal.

In some embodiments, portions of first and second conductors 310 and 320 may be configured to have different electromagnetic field amplitudes at a resonant frequency of antenna device 300 when signal feed terminal 302*a* is driven at that resonant frequency. For example, first signal portion SP1 may be configured to have a first electromagnetic field amplitude at a first resonant frequency (e.g., a cellular mid band resonance) and second signal portion SP2 may be configured to have a second electromagnetic field amplitude at the first resonant frequency when signal feed terminal 302*a* is driven at the first resonant frequency. For instance, first signal portion SP1 may be located closer to an electromagnetic field amplitude peak at the first resonant frequency than signal portion SP2 is, and/or second signal portion SP2 may be located closer to an electromagnetic field amplitude trough than first signal portion SP1 is. In the embodiment illustrated in FIG. 3B, first signal portion SP1 is located at a distance L1 along the length of first conductor 310, which is close to an electric field amplitude peak at first resonant frequency RF1, and second signal portion SP2 is located at a distance L2 along the length of first conductor 310, which is close to an electric field amplitude trough at first resonant frequency RF1.

In some embodiments, antenna device 300 may be configured as a standing wave antenna device. For example, as shown in FIG. 3B, electromagnetic field amplitudes (e.g., peaks and troughs) along the length of first conductor 310 may have static positions at resonant frequencies RF1, RF2, and RF3, such that a portion of first conductor 310 having a static peak or trough in electromagnetic field amplitude may be appropriately spaced from second conductor 320. In some embodiments, first conductor 310 as shown in FIG. 3A may include a monopole configured to couple to second conductor 320 across gap G. According to various embodiments, first conductor 310 may alternatively or additionally include an inverted-F, a dipole, a patch, and/or combinations thereof. For instance, an inverted-F antenna may have a first portion coupled to ground and a second portion configured to operate as illustrated in FIG. 3A.

In some embodiments, portions of first and second conductors 310 and 320 may be configured to provide different amounts of coupling between first and second conductors 310 and 320 at a resonant frequency. For example, first reference portion RP1 may be spaced from first signal portion SP1 by a first gap distance configured to provide a first amount of coupling between first signal portion SP1 and first reference portion RP1 at the first resonant frequency and second reference portion RP2 may be spaced from second signal portion SP2 by a second gap distance configured to provide a second amount of coupling between second signal portion SP2 and second reference portion RP2 at the first resonant frequency. For instance, as shown in FIG. 3A, the gap distance between second signal portion SP2 and second reference portion RP2 (across second gap region R2) is larger than the gap distance between first signal portion SP1 and first reference portion RP1 (across fourth gap region R4). In some embodiments, a larger gap distance between second signal portion SP2 and second reference portion RP2 than between first signal portion SP1 and first reference portion RP1 may result in a larger amount of coupling between first signal portion SP1 and first reference portion RP1 than between second signal portion SP2 and second reference portion RP2. For instance, closer positioning between first signal portion SP1 and first reference portion RP1 than between second signal portion SP2 and second reference portion RP2 may result in a larger amount of capacitive coupling between first signal portion SP1 and first reference portion RP1 than between second signal portion SP2 and second reference portion RP2.

In some embodiments, different amounts of coupling between portions of first and second conductors 310 and 320 at different resonant frequencies may tune an impedance of antenna device 300 at the different resonant frequencies. For example, similar to as described for antenna device 200, the first gap distance between first signal portion SP1 and first reference portion RP1 (across fourth gap region R4) may be configured to tune an impedance of antenna device 300 at first resonant frequency RF1. For instance, in some embodiments, where the first gap distance provides coupling at first resonant frequency RF1, and first signal portion SP1 has a large electromagnetic field amplitude, a large amount of electromagnetic energy may be coupled between first signal portion SP1 and first reference portion RP1 at first resonant frequency RF1, contributing significantly to controlling the impedance of antenna device 300 at first resonant frequency RF1. At the same time, in some embodiments, where the second gap distance provides a comparatively small amount of coupling at first resonant frequency RF1, and where second signal portion SP2 has a comparatively small electromagnetic field amplitude at first resonant frequency RF1, a comparatively small amount of electromagnetic energy may be coupled between second signal portion SP2 and second reference portion RP2 at first resonant frequency RF1, resulting in comparatively less impact on the impedance of antenna device 300 at first resonant frequency RF1.

In some embodiments, the second gap distance between second signal portion SP2 and second reference portion RP2 (across second gap region R2) may be configured to tune an impedance of antenna device 300 at a second resonant frequency. For example, the second gap distance between second signal portion SP2 and second reference portion RP2 may be configured to provide an amount of coupling between second signal portion SP2 and second reference portion RP2 at the second resonant frequency. For instance, in the illustrated embodiment of FIG. 3B, the distance L2 of second signal portion SP2 along first conductor 310 is close to an electric field amplitude peak at second resonant frequency RF2. In some embodiments, the amount of coupling between second signal portion SP2 and second reference portion RP2 across the second gap distance combined with the electromagnetic field amplitude of second signal portion SP2 at second resonant frequency RF2 may result in a significant contribution to controlling the impedance of antenna device 300 at second resonant frequency RF2 (e.g., cellular low band). At the same time, in some embodiments, where the first gap distance provides a comparatively small amount of coupling at second resonant frequency RF2, and where first signal portion SP1 has a comparatively small electromagnetic field amplitude at second resonant frequency RF2, a comparatively small amount of electromagnetic energy may be coupled between first signal portion SP1 and first reference portion RP1 at second resonant frequency RF2, resulting in comparatively less impact on the impedance of antenna device 300 at second resonant frequency RF2.

While FIGS. 3A-3B illustrate an example antenna device in which portions of the conductors may be configured to have different electric field amplitudes and to couple different amounts of electromagnetic energy therebetween, it should be appreciated that portions of an antenna device may be alternatively or additionally configured to have different magnetic field amplitudes and to couple different amounts of electromagnetic energy therebetween. For example, in some embodiments, aspects described herein may be implemented in a magnetic antenna device exhibiting magnetic fields equivalent to the electric fields shown in FIGS. 3A-3B.

Figure 4:
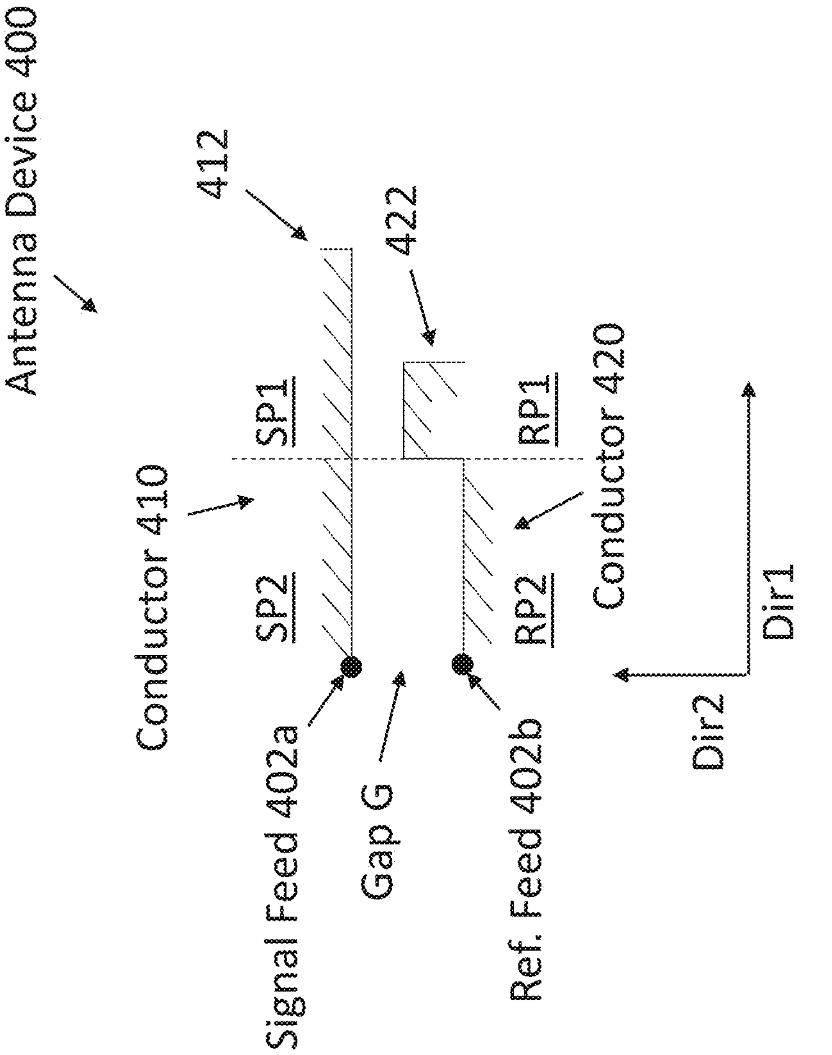
FIG. 4 is a schematic view of an example antenna device having multiple conductors with offset terminations in a direction of elongation.

FIG. 4 is a schematic view of an example antenna device 400 having multiple conductors 410, 420 with offset terminations in a direction of elongation.

In some embodiments, antenna device 400 may be configured as described herein for antenna device 200 and/or 300, such as including first and second conductors 410 and 420, and with first conductor 410 including a signal feed terminal 402*a* and second conductor 420 including a reference feed terminal 402*b*. For example, conductors 410 and 420 may be disposed on a dielectric support as described herein for antenna device 200 and/or 300. In FIG. 4, first and second conductors 410 and 420 are further shown separated by a gap G, which may have multiple regions such as described herein for antenna device 200 and/or 300, though fewer or greater numbers of regions and/or different gap distances may be used. In some embodiments, first conductor 410 and second conductor 420 may be configured to form a coupled line.

In some embodiments, first conductor 410 may include a first portion terminating in a conductor termination and a second portion terminating in the first portion. For example, as shown in FIG. 4, first conductor 410 includes a first signal portion SP1 elongated in a first direction Dir1 and including a first conductor termination 412 in first direction Dir1. For instance, in FIG. 4, first signal portion SP1 has its longest dimension in first direction Dir1. In some embodiments, first signal portion SP1 may be electrically (e.g., conductively) connected to signal feed terminal 402*a*. Also shown in FIG. 4, first conductor 410 includes a second signal portion SP2 terminating, in first direction Dir1, in first signal portion SP1. For instance, while first conductor 410 may terminate, in first direction Dir1, at first conductor termination 412, first conductor 410 may extend farther in other directions (e.g., Dir2) beyond first conductor termination 412. Similarly, while second signal portion SP2 may terminate, in first direction Dir1, in first signal portion SP1, second signal portion SP2 may extend farther in other directions (e.g., Dir2) beyond first signal portion SP1.

As used herein, a portion of a conductor is considered to be "elongated" in a direction of the longest dimension of that portion of the conductor, and where a portion has two or more equal and longest dimensions (e.g., a flat square), that portion is not elongated in any direction.

In some embodiments, second conductor 410 may include a first portion terminating in a second conductor termination and a second portion terminating in the first portion, the first and second portions of first and second conductors 410 and 420 being spaced at different distances in a direction perpendicular to the direction of the conductor terminations. For example, as shown in FIG. 4, second conductor 420 includes a first reference portion RP1 elongated in first direction Dir1 and including a second conductor termination 422 in first direction Dir1, and first reference portion RP1 is spaced from first signal portion SP1, in second direction Dir2, by a first gap distance. In some embodiments, first reference portion RP1 may be electrically (e.g., conductively) connected to reference feed terminal 402*b*. Also shown in FIG. 4, second conductor 420 includes a second reference portion RP2 elongated in first direction Dir1 and spaced from second signal portion SP2 in second direction Dir2 by a second gap distance that is greater than the first gap distance, and second reference portion RP2 terminates, in first direction Dir1, at first reference portion RP1.

In some embodiments, first conductor termination 412 and second conductor termination 422 may be offset in first direction Dir1. For example, as shown in FIG. 4, first conductor termination 412 extends beyond second conductor termination 422 in first direction Dir1 (away from second signal portion SP2). As such, first signal portion SP1 extends, in first direction Dir1 (away from second signal portion SP2), beyond second conductor termination 422.

In some embodiments, having first and second conductor terminations 412 and 422 offset and having first signal portion SP1 spaced from first reference portion RP1 by a closer gap distance than second signal portion SP2 is spaced from second reference portion RP2 may provide advantageous coupling between first signal portion SP1 and first reference portion RP1 (e.g., for tuning an impedance of antenna device 400), while preventing potentially disadvantageous coupling between first reference portion RP1 and first conductor termination 412. For example, first conductor termination 412, in first direction Dir1, may cause at least some current flowing in first conductor 410 proximate first conductor termination 412 to curl (e.g., from first direction Dir1 toward a direction in which first conductor 410 extends beyond first conductor termination 412). In some cases, coupling to current that curls proximate first conductor termination 412 may not contribute to controlling the impedance of antenna device 400. Accordingly, in some embodiments, having first and second conductor terminations 412 and 422 offset and having first signal portion SP1 spaced from first reference portion RP1 by a closer gap distance than second signal portion SP2 is spaced from second reference portion RP2 may limit or prevent disadvantageous coupling to curling current at or proximate first conductor termination 412.

In some embodiments, the different gap distances separating the first signal and reference portions and the second signal and reference portions of antenna device 400 may correspond to multiple resonant frequencies at which antenna device 400 is configured to operate, such as described above in connection with antenna devices 200 and 300. For example, the first gap distance between first signal portion SP1 and first reference portion RP1 may correspond to a first resonant frequency and the second gap distance between second signal portion SP2 and second reference portion RP2 may correspond to a second resonant frequency different from the first resonant frequency. For instance, the first gap distance may be configured to tune an impedance of antenna device 400 at the first resonant frequency (e.g., by providing coupling at the first resonant frequency between first conductor 410 and second conductor 420) and the second gap distance may be configured to tune the impedance of antenna device 400 at the second resonant frequency (e.g., in like manner).

In some embodiments, the first and second signal portions of antenna device 400 may be configured to have different electromagnetic field amplitudes at a given resonant frequency when signal feed terminal 402*a* is driven at that resonant frequency, and the different gap distances between the respective first signal and reference portions and between the second signal and reference portions may provide different amounts of coupling, such as described above in connection with antenna device 300. For example, first signal portion SP1 may be configured to have a first electromagnetic field amplitude and second signal portion SP2 may be configured to have a second, smaller electromagnetic field amplitude at a first resonant frequency when signal feed terminal 402*a* is driven at the first resonant frequency, and the first gap distance may be configured to provide a larger amount of coupling between first signal portion SP1 and first reference portion RP1 than the second gap distance is configured to provide between second signal portion SP2 and second reference portion RP2.

While not shown in FIG. 4, it should be appreciated that first conductor 410 may further include a third signal portion (e.g., SP3 in FIG. 3A) coupled between second signal portion SP2 (FIG. 4) and signal feed terminal 402*a*, and second conductor 420 may further include a third reference portion (e.g., RP3 in FIG. 3A) coupled between second reference portion RP2 (FIG. 4) and reference feed terminal 402*b*. For example, the third reference portion may be spaced from the third signal portion by a third gap distance (e.g., across gap region R2 in FIG. 3A) different from the first and second gap distances.

FIGS. 5A-7B illustrate an example mobile device 500 having an antenna device 530 according to some techniques described herein. FIGS. 8A-8E further illustrate antenna device 530 of mobile device 500.

Figure 5A:
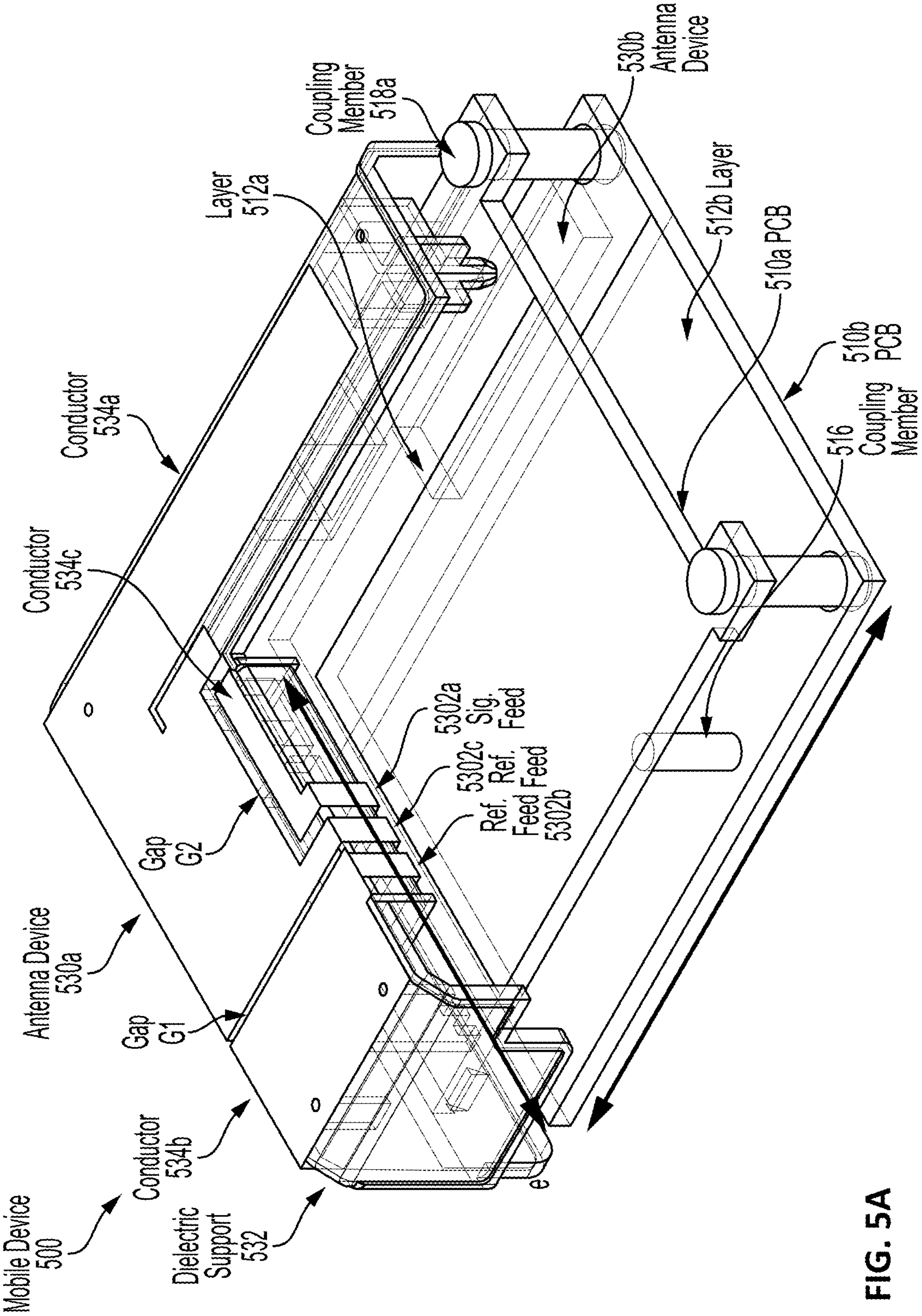
FIG. 5A is a perspective view of mobile device having multiple antenna devices.
Figure 5B:
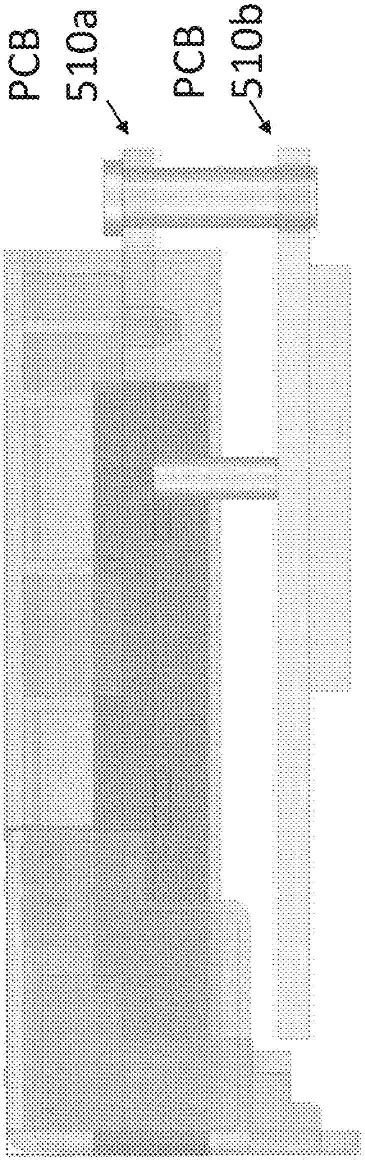
FIG. 5B is a first side view of the mobile device of FIG. 5A.
Figure 5C:
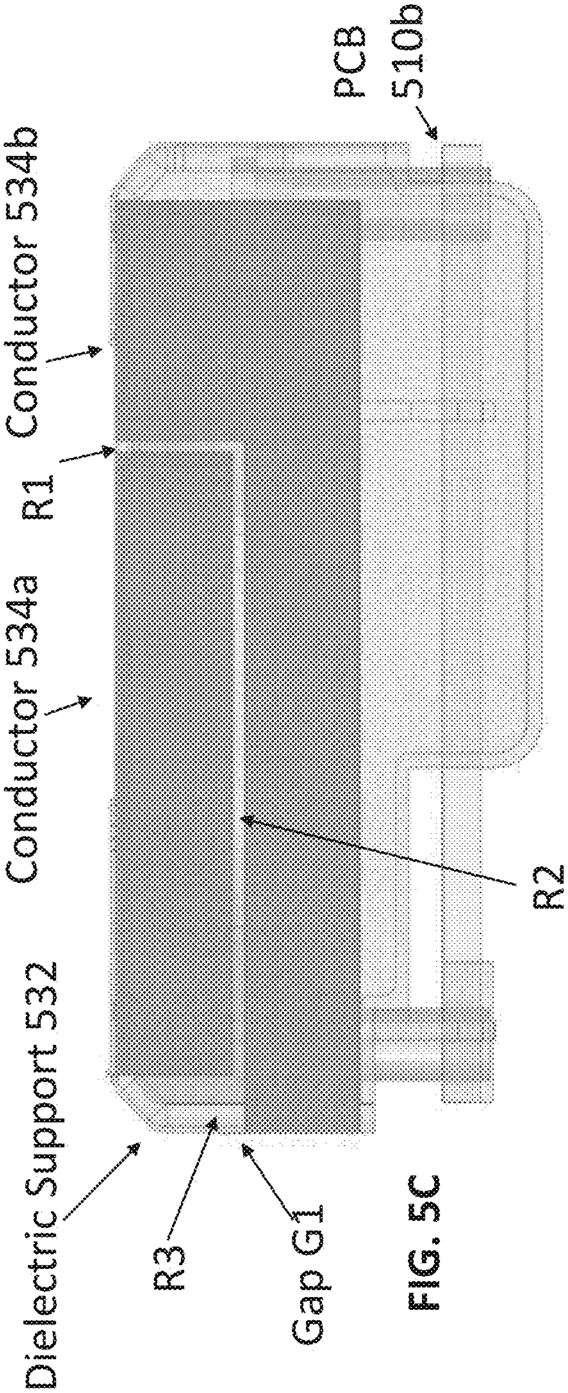
FIG. 5C is a second side view of the mobile device of FIG. 5A opposite the first side view.

FIG. 5A is a perspective view of mobile device 500 having multiple antenna devices 530*a*, 530*b*. FIG. 5B is a first side view of mobile device 500. FIG. 5C is a second side view of mobile device 500 opposite the first side view.

In some embodiments, mobile device 500 may be configured as described herein in connection with mobile device 100, 100', and/or 150. For example, as shown in FIG. 5A, mobile device 500 includes PCBs 510*a* and 510*b* and antenna devices 530*a* and 530*b*. For instance, PCB 510*a* may support a communication circuit (e.g., 120) configured to operate antenna device 530*a* and PCB 510*b* may support a communication circuit configured operate antenna device 530*b*. For instance, antenna device 530*a* may be configured to operate in cellular frequency bands and antenna device 530*b* may be configured to operate in GNSS frequency bands. In some embodiments, mobile device 500 may include a device housing (not shown) enclosing the components illustrated in FIG. 5A.

In some embodiments, first antenna device 530*a* of mobile device 500 may be configured as described herein for antenna device 200 and may include the same or similar advantages. For example, as shown in FIG. 5A, first antenna device 530*a* includes first and second conductors 534*a* and 534*b* disposed on a dielectric support 532. In the illustrated embodiment, dielectric support 532 is a molded plastic component having first and second conductors 534*a* and 534*b* plated thereon using an LDS process. Also shown in FIG. 5A, first antenna device 530*a* further includes a third conductor 534*c*, which is described further below. In some embodiments, second antenna device 530*b* may be alternatively or additionally configured as described herein for any or each of antenna devices 200, 300, and/or 400, and may include the same or similar advantages.

Figure 6:
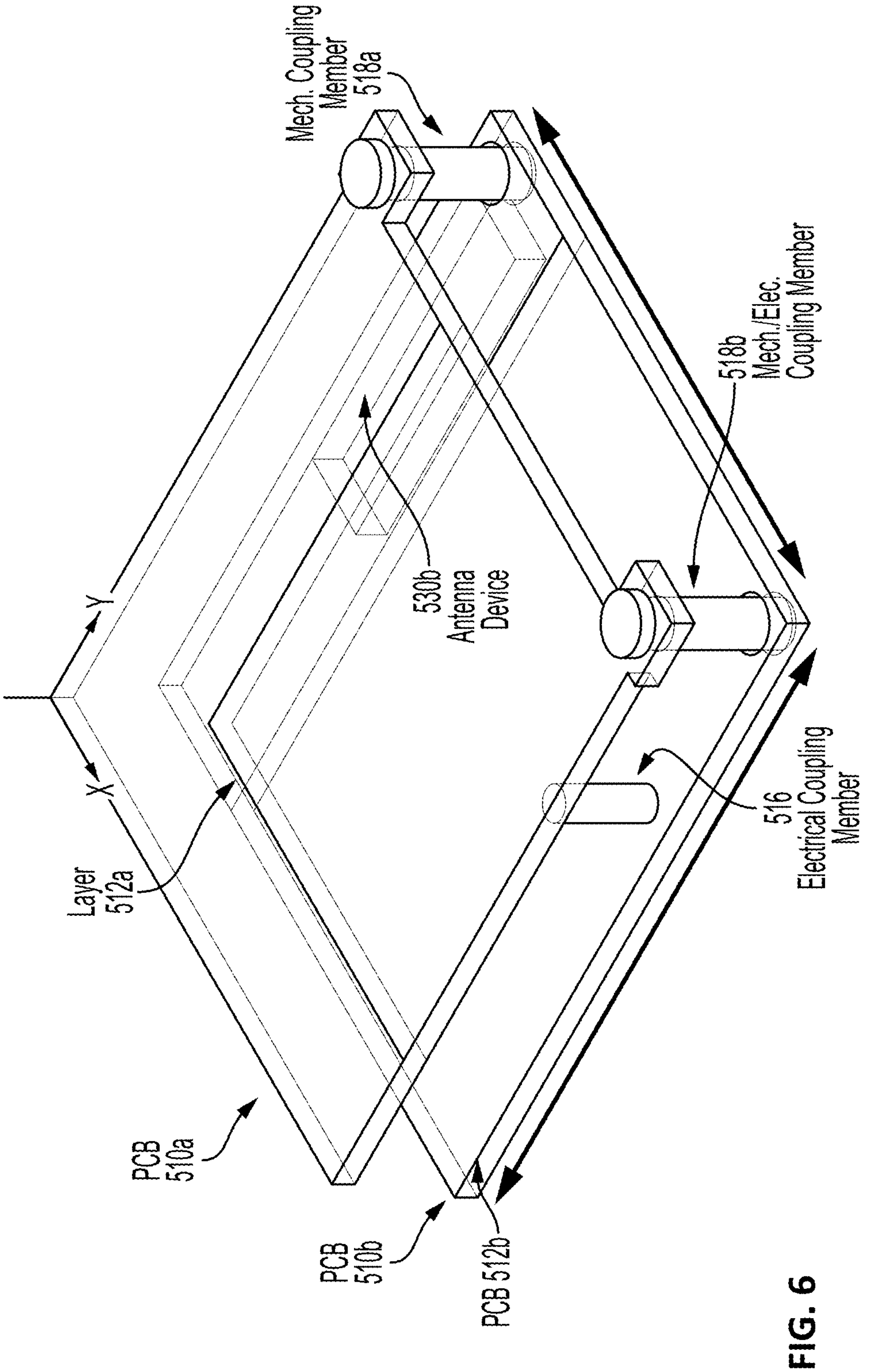
FIG. 6 is a perspective view of the PCBs and the second antenna device of the mobile device of FIG. 5A.
Figure 7A:
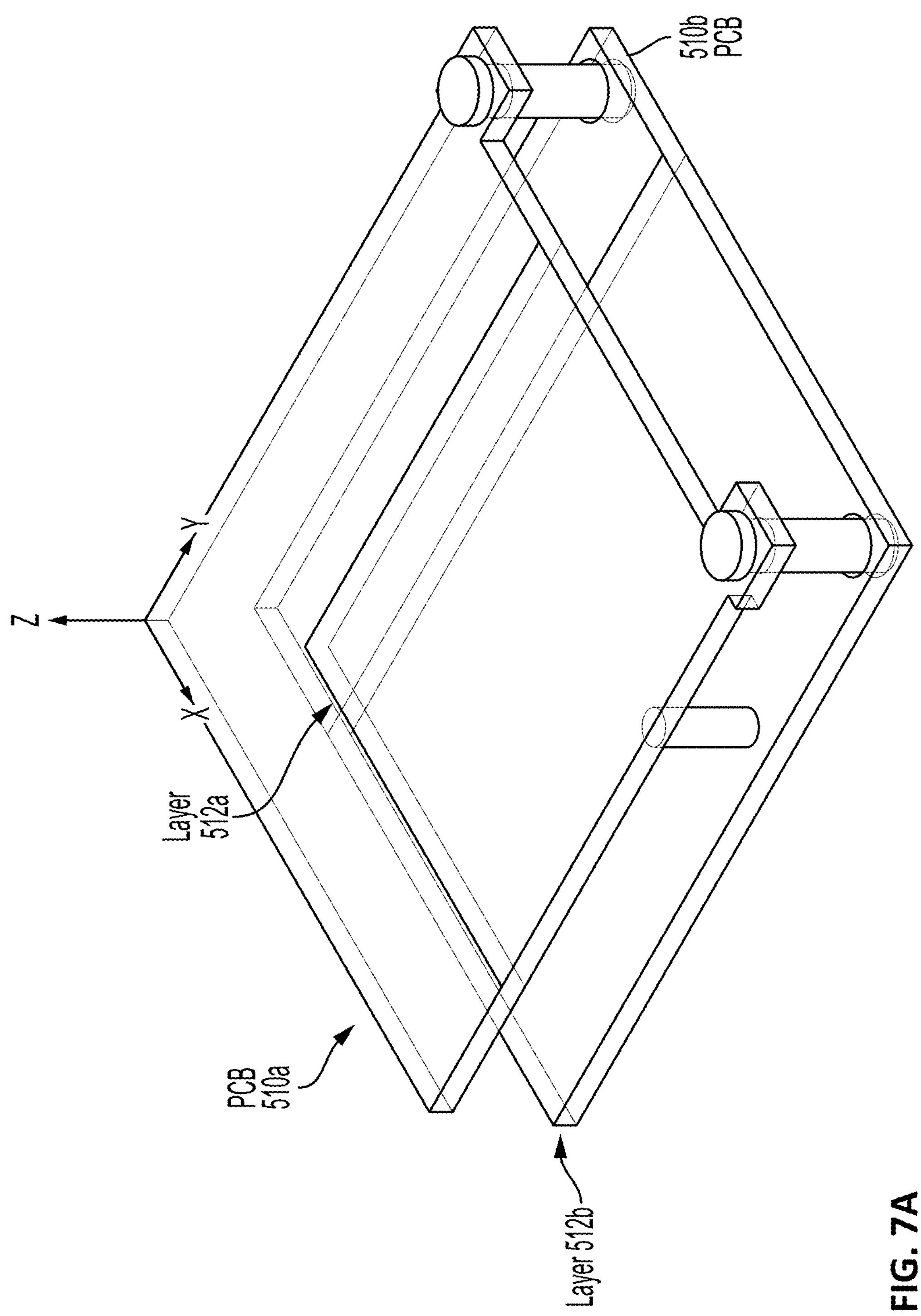
FIG. 7A is a perspective view of the PCBs of the mobile device of FIG. 5A.
Figure 7B:
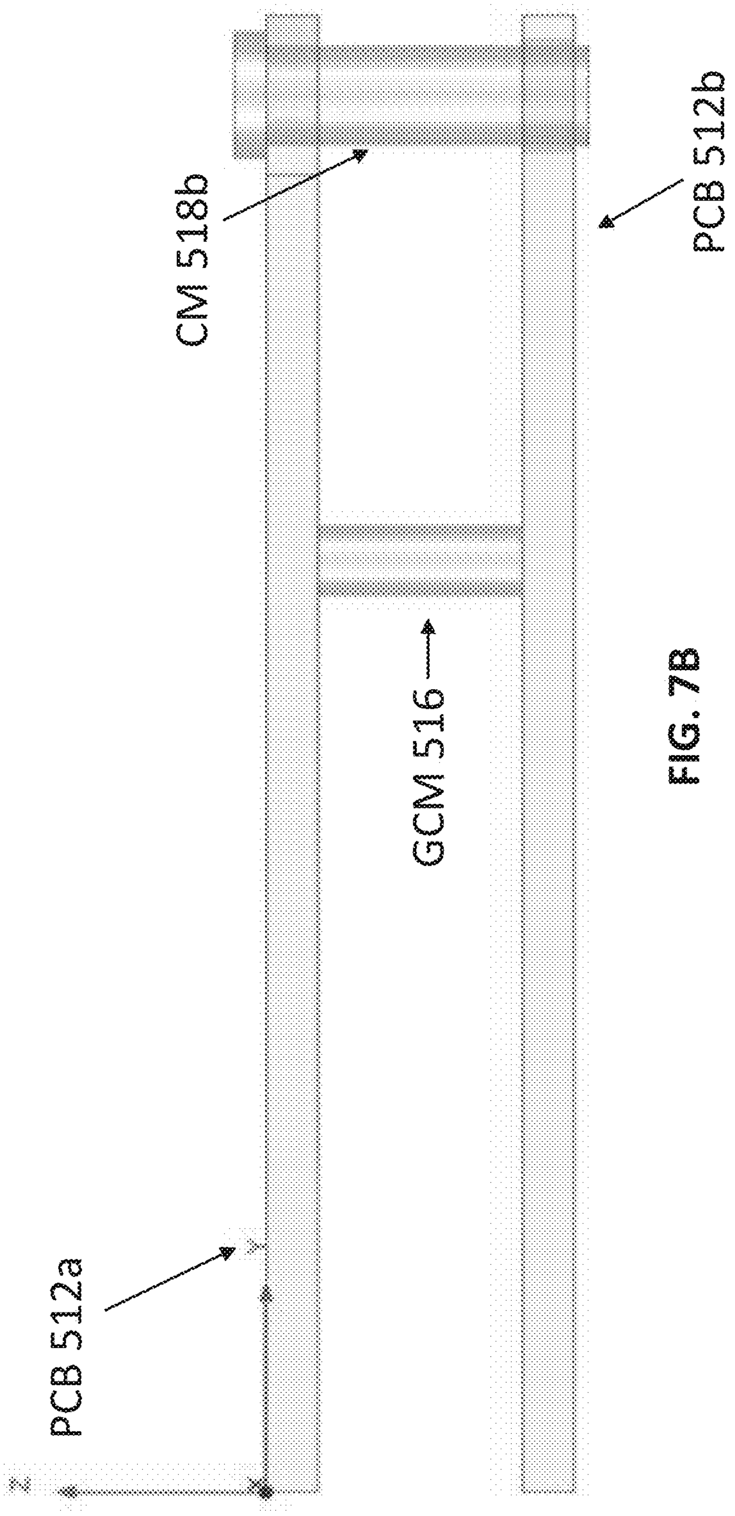
FIG. 7B is a side view of the PCBs of the mobile device of FIG. 5A.

FIG. 6 is a perspective view of PCBs 510*a* and 510*b* and second antenna device 130*b*. FIG. 7A is a perspective view of PCBs 510*a* and 510*b* without second antenna device 530*b*. FIG. 7B is a side view of PCBs 510*a* and 510*b* without second antenna device 530*b*.

In some embodiments, a mobile device may have multiple PCBs, such as shown for PCBs 510*a* and 510*b* of mobile device 500 in FIG. 6. For example, each PCB 510*a* and 510*b* may support a communication circuit that is coupled to an antenna device. In some cases, having multiple PCBs supporting circuitry may make efficient use of the depth area within a device housing for holding components, such that the length and width of the mobile device may be made compact as compared to using a single, longer and/or wider PCB. In other cases, a single PCB for supporting communication circuits may be used.

In some embodiments, PCB 510*a* and/or 510*b* may have conductive material forming a ground plane. For example, as shown in FIG. 6, PCB 510*a* has a layer 512*a* and PCB 510*b* has a layer 512*b*, each of which may be configured as a ground plane. For instance, when a communication circuit is disposed on PCB 510*a* and/or 510*b* and coupled to an antenna device, the communication circuit and antenna device may operate with reference to the ground plane of layer 512*a* and/or 512*b*.

In some embodiments, multiple PCBs of a mobile device may be electrically and mechanically interconnected. For example, as shown in FIGS. 6 and 7A-7B, an electrical coupling member 516 is shown electrically connecting layers 512*a* and 512*b*. In some embodiments, coupling member 516 may be configured as a board-to-board electrical connector. For example, coupling member 516 may include conductive material configured to electrically interconnect conductive material of layers 512*a* and 512*b*, such as to unite ground plane references provide by layers 512*a* and 512*b*. Also shown in FIGS. 6 and 7A-7B, mechanical coupling members 518*a* and 518*b* are shown connecting PCBs 510*a* and 510*b*. For instance, mechanical coupling members 518*a* and 518*b* may include robust material (e.g., hard plastic, metal) configured to hold PCBs 510*a* and 510*b* with respect to one another, such as using a pin and/or screw.

In some embodiments, a mechanical coupling member may be further configured as an electrical and mechanical coupling member to electrically connect components of PCBs 510*a* and 510*b*. For example, as shown in FIG. 6, mechanical coupling member 518*b* may be electrically coupled to conductive material of layers 512*a* and 512*b*, such as where mechanical coupling member 518*b* includes conductive material (e.g., as a metal screw). For instance, holes (e.g., threaded holes) to which mechanical coupling member 518*b* is coupled (e.g., fastened) may be plated with conductive material that is connected to ground planes of layers 512*a* and 512*b*.

Figure 8A:
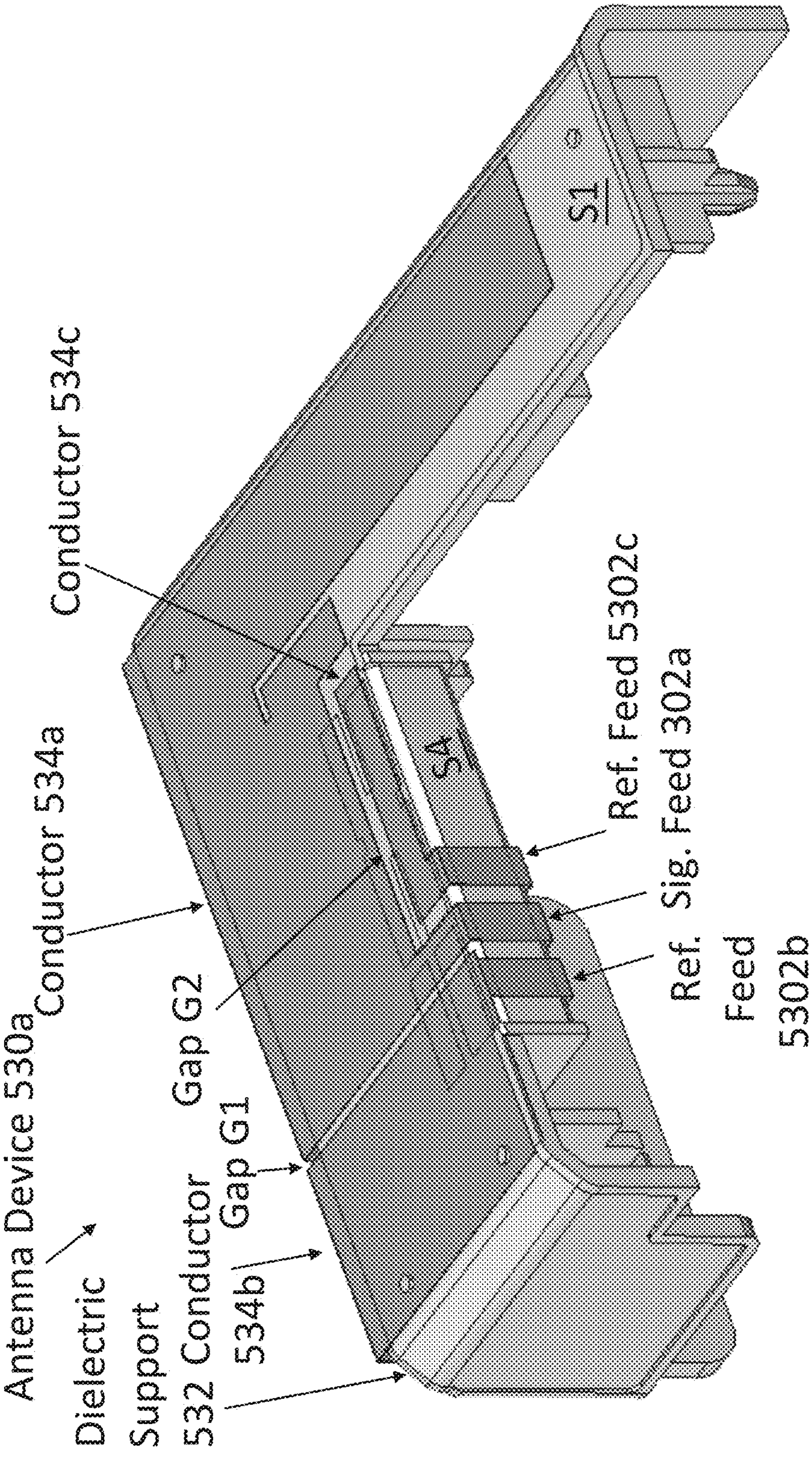
FIG. 8A is a first perspective view of the first antenna device of the mobile device of FIG. 5A.
Figure 8B:
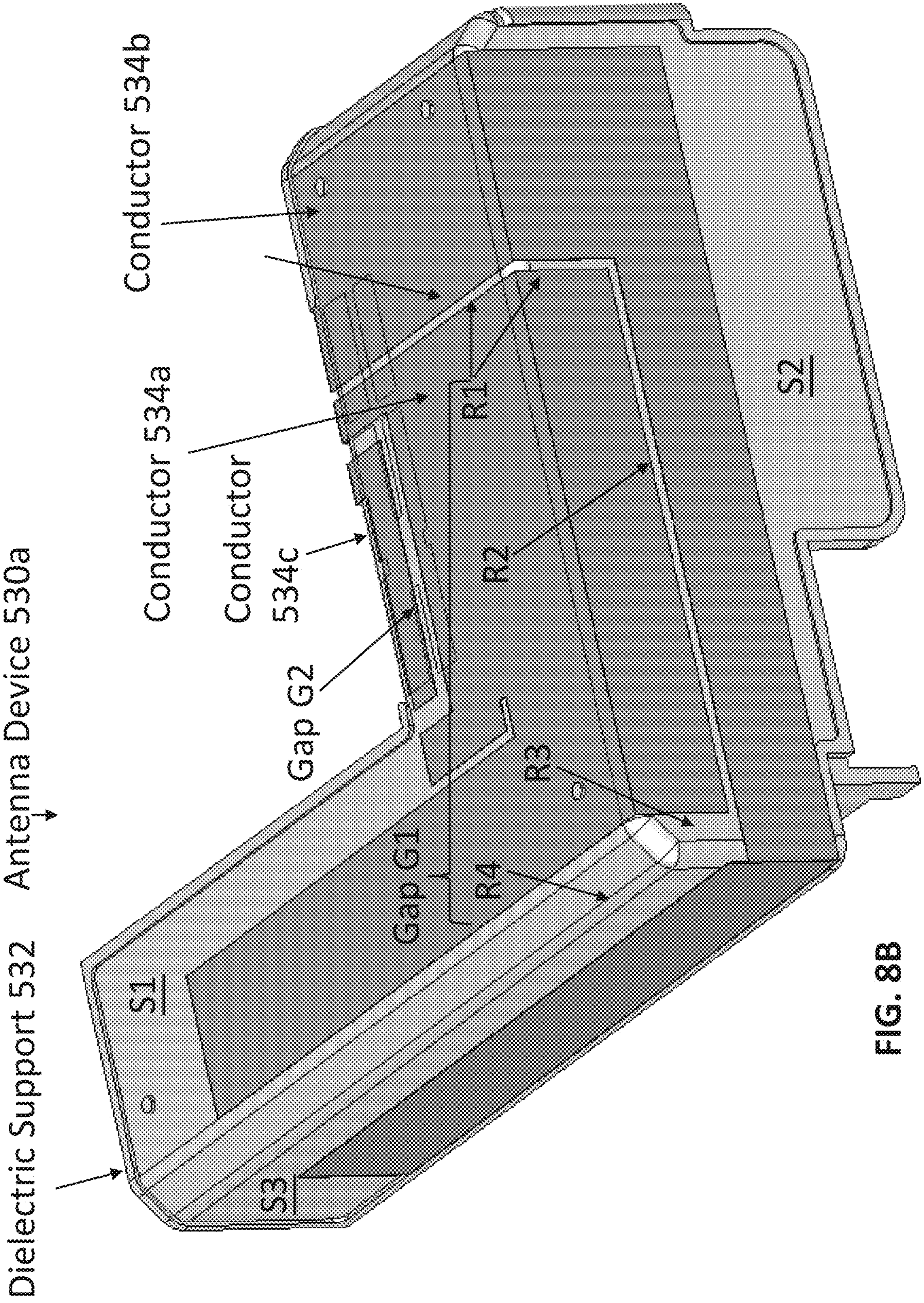
FIG. 8B is a second perspective view of the first antenna device of the mobile device of FIG. 5A opposite the first perspective view illustrating further regions of the first gap.
Figure 8C:
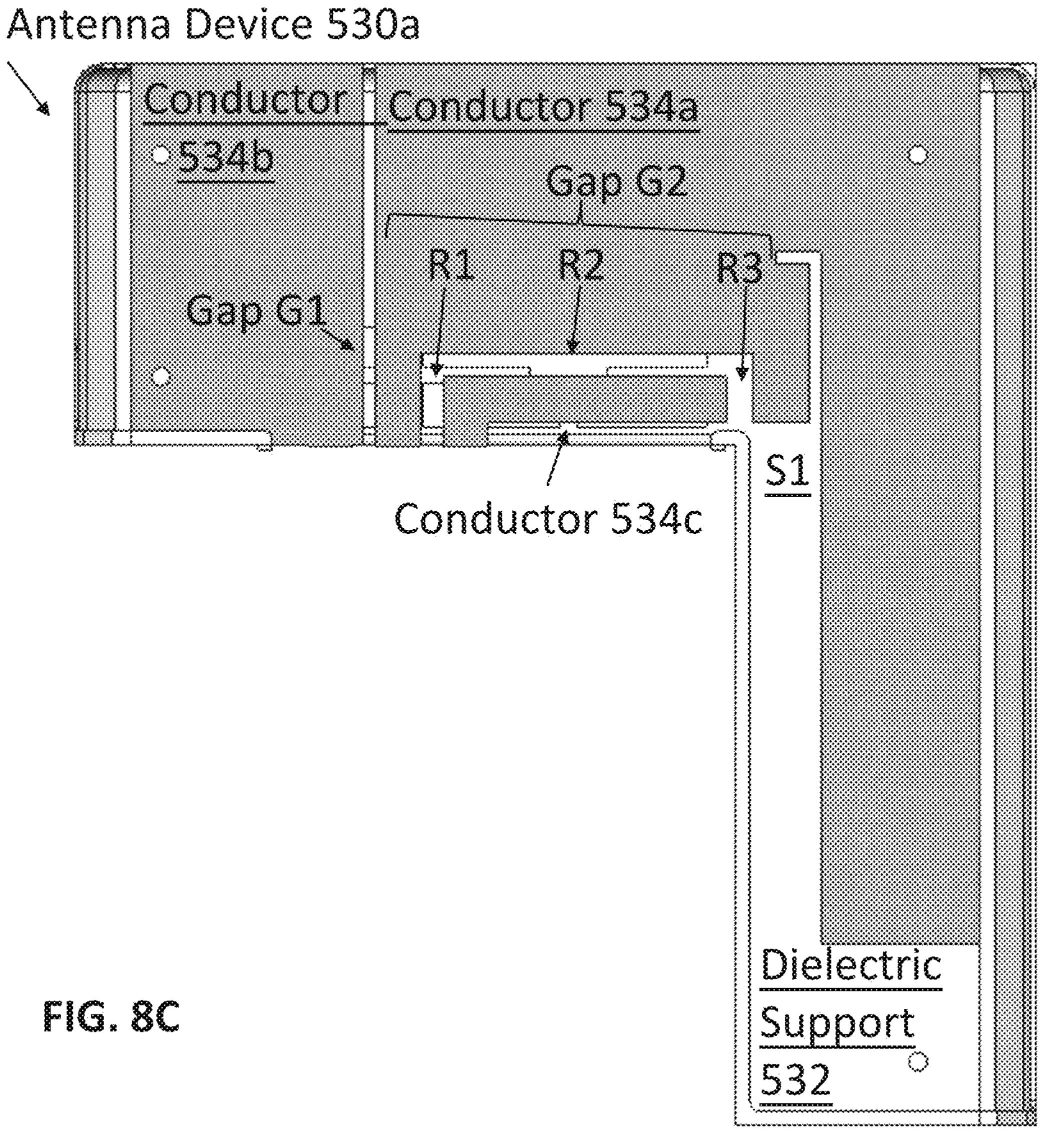
FIG. 8C is a top view of the first antenna device of the mobile device of FIG. 5A further illustrating the first and second gaps.
Figure 8D:
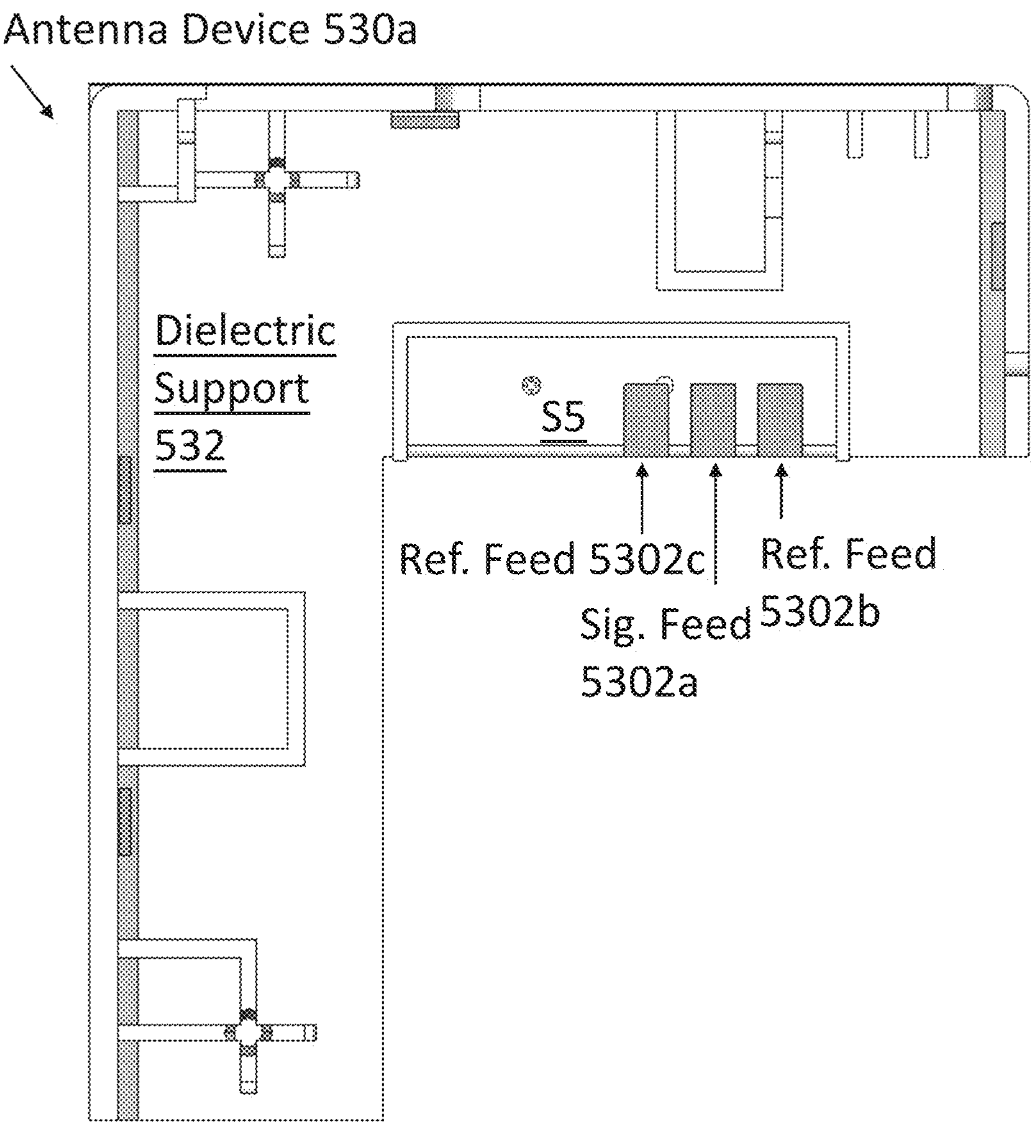
FIG. 8D is a bottom view of the first antenna device of the mobile device of FIG. 5A further illustrating the signal and reference feed terminals.
Figure 8E:
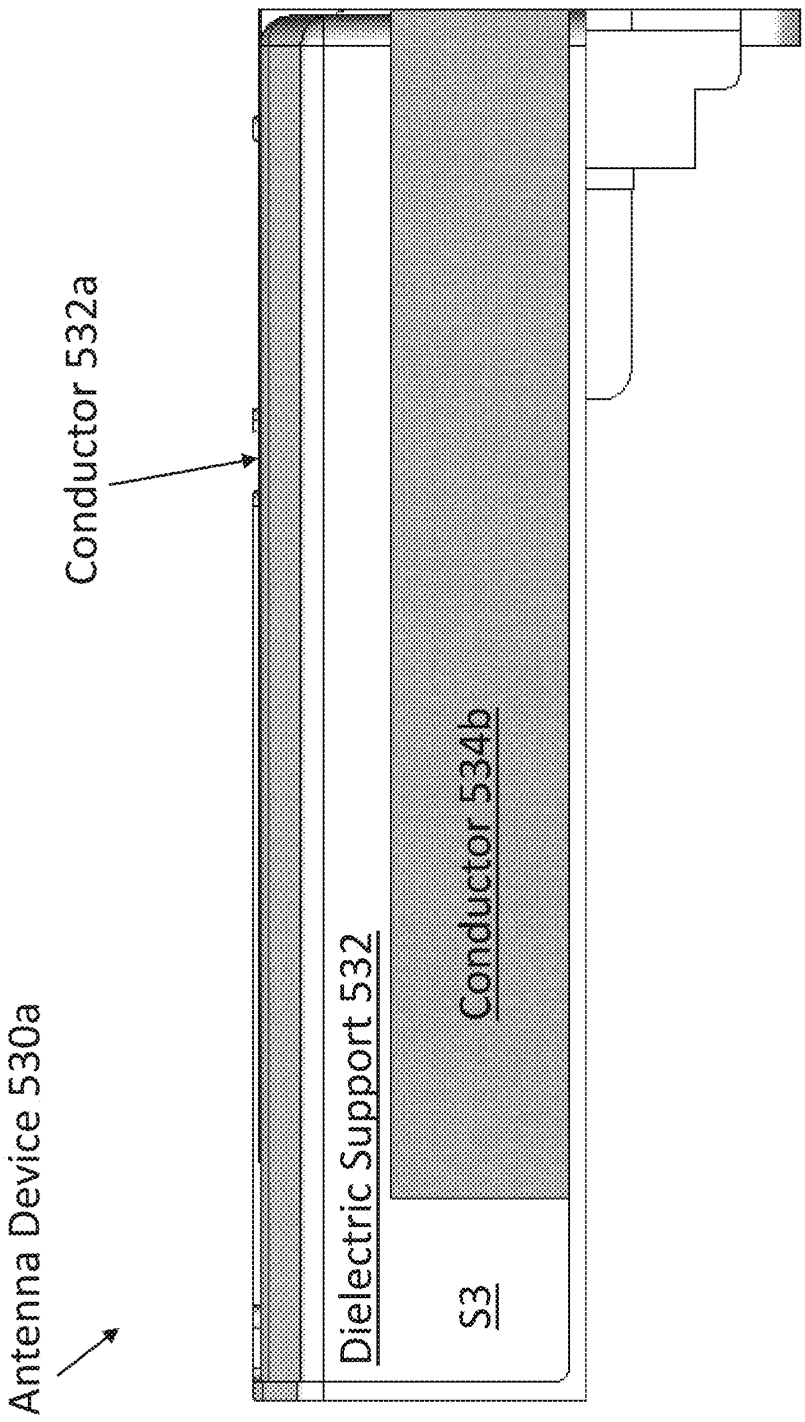
FIG. 8E is a side view of the first antenna device of the mobile device of FIG. 5A further illustrating the first and second conductors.

FIG. 8A is a first perspective view of antenna device 530*a* of mobile device 500. FIG. 8B is a second perspective view of antenna device 530*a* opposite the first perspective view illustrating further regions of gap G1. FIG. 8C is a top view of antenna device 530*a* further illustrating gaps G1 and G2. FIG. 8D is a bottom view of antenna device 530*a* further illustrating signal feed terminal 5302*a* and reference feed terminals 5302*b* and 5302*c*. FIG. 8E is a side view of antenna device 530*a* further illustrating first and second conductors 534*a* and 534*b*.

In some embodiments, conductors of antenna device 530*a* may be spaced apart by a gap having regions of different gap distance, such as described herein for antenna device 200, which may provide the same or similar advantages. For example, as shown in FIG. 8A, first and second conductors 534*a* and 534*b* are separated by a gap G1. And, as further shown in FIG. 8B, first gap G1 has regions R1, R2, R3, and R4 in which first and second conductors 534*a* and 534*b* are spaced from one another by different gap distances. It should be appreciated that more or fewer gap regions may be provided and/or may have different gap distances. In some embodiments, gap distances provided by any or each of regions R1-R4 may be configured to tune an impedance of antenna device 530*a* (e.g., as experienced by signals carried therein), such as described herein in connection with antenna device 200 and may provide the same or similar advantages.

In some embodiments, antenna device 530*a* may include multiple gaps spacing apart pairs of conductors disposed on dielectric support 532. For example, as shown in FIG. 8A, in addition to first gap G1 spacing apart first conductor 534*a* and second conductor 534*b*, a second gap G2 spaces apart first conductor 534*a* and third conductor 534*c*. In some embodiments, second gap G2 may have a region in which first conductor 534*a* and third conductor 534*c* are spaced apart by a gap distance different from gap distances of one or more regions of first gap G1. For example, as in shown in FIGS. 8A-8C, region R2 of second gap G2 may space apart first conductor 534*a* and third conductor 534*c* by a gap distance larger than the gap distances of regions R1, R2, R3, and R4 of first gap G1. In other embodiments, gap distances of at least some regions of first and second gaps G1 and G2 may be the same.

In some embodiments, second gap G2 may alternatively or additionally include regions in which first conductor 534*a* and third conductor 534*c* are spaced apart by different gap distances. For example, as shown in FIG. 8C, first conductor 534*a* and third conductor 534*c* may be spaced apart by larger gap distances in gap regions R2 and R3 of second gap G2 than in gap region R1 of second gap G2.

In some embodiments, antenna device 530*a* may have a dielectric support with multiple planar surfaces having gaps between conductors on at least two of the planar surfaces. For example, as shown in FIG. 8B, dielectric support 532 has a first planar surface S1 on which a portion of gap region R1 of first gap G1 is disposed, a second planar surface S2 on which gap regions R2 and R3, and a portion of gap region R1 of first gap G1 are disposed. In the illustrated embodiment, dielectric support further includes a third planar surface S3 on which gap region R4 of first gap G1 is disposed. In some embodiments, fewer regions of a gap may be disposed on different planar surfaces of a dielectric support. For example, further shown in FIG. 8C, gap regions R1, R2, and R3 of second gap G2 are shown disposed on the same first planar surface S1 of dielectric support 532. In another example, only two gap regions of a gap spacing apart conductors may be disposed on different planar surfaces of a dielectric support.

In some embodiments, conductors of antenna device 530*a* may be disposed on multiple planar surfaces of dielectric support 532. For example, as shown in FIGS. 8A-8B, first conductor 534*a* is disposed on first planar surface S1 and second planar surface S2. Also shown in FIGS. 8A-8B and further in FIG. 8E, second conductor 534*b* is disposed on first planar surface S1, second planar surface S2, and third planar surface S3. And, as shown in FIG. 8A, third conductor 534*c* is disposed on first planar surface S1. In some embodiments, conductors of antenna 530*a* may be fed via further planar surfaces of dielectric support 532. For example, as shown in FIGS. 8A and 8D, first, second, and third conductors 534*a*, 534*b*, and 534*c* may span a fourth planar surface S4 of dielectric support 532 to reach signal feed terminal 5302*a* and reference feed terminals 5302*b* and 5302*c* disposed on a fifth planar surface S5 of dielectric support 532. In other embodiments, an antenna device may span one or fewer additional planar surfaces to reach feed terminals.

In some embodiments, antenna device 530*a* may have feed terminals such as described herein for antenna device(s) 200, 300, and/or 400. For example, as shown in FIG. 8D, first conductor 534*a* may include a signal feed terminal 5302*a* and second conductor 534*b* may include a first reference feed terminal 5302*b*. As further shown in FIG. 8D, third conductor 534*c* may include a second reference feed terminal 5302*c*. For instance, in a single-ended configuration (e.g., FIG. 1A), signal feed terminal 5302*a* may be configured to provide and/or receive a signal to and/or from a communication circuit (e.g., 120), and first and second reference feed terminals 5302*b* and 5302*c* may be configured for coupling to a ground plane (e.g., layer 512*a*). Alternatively, in a differential configuration (e.g., FIG. 1B), signal feed terminal 5302*a* may be configured to provide and/or receive a first differential signal component to and/or from a communication circuit and signal feed terminals 5302*b* and 5302*c* may be configured to provide and/or receive a second differential signal component to and/or from the communication circuit. In other embodiments, a differential configuration may be implemented with a first conductor configured to receive and/or provide a first differential signal component, a second conductor configured to receive and/or provide a second differential signal component, and a third conductor configured for coupling to a ground plane.

FIGS. 9A-9E illustrate an alternative example antenna device 900 that may be included in mobile device 500.

Figure 9A:
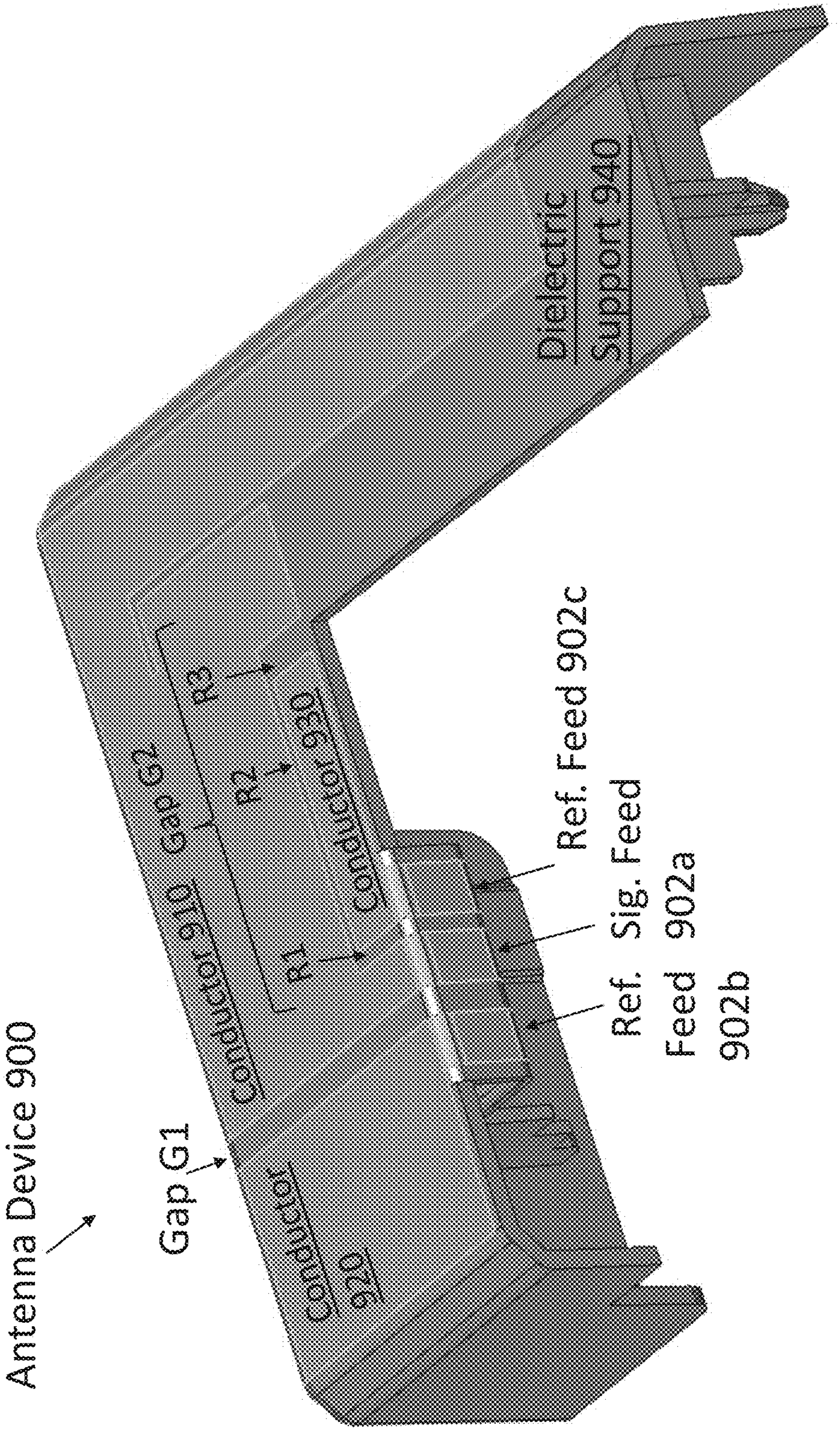
FIG. 9A is a first perspective view of alternative example antenna device that may be included in the mobile device of FIG. 5A.
Figure 9B:
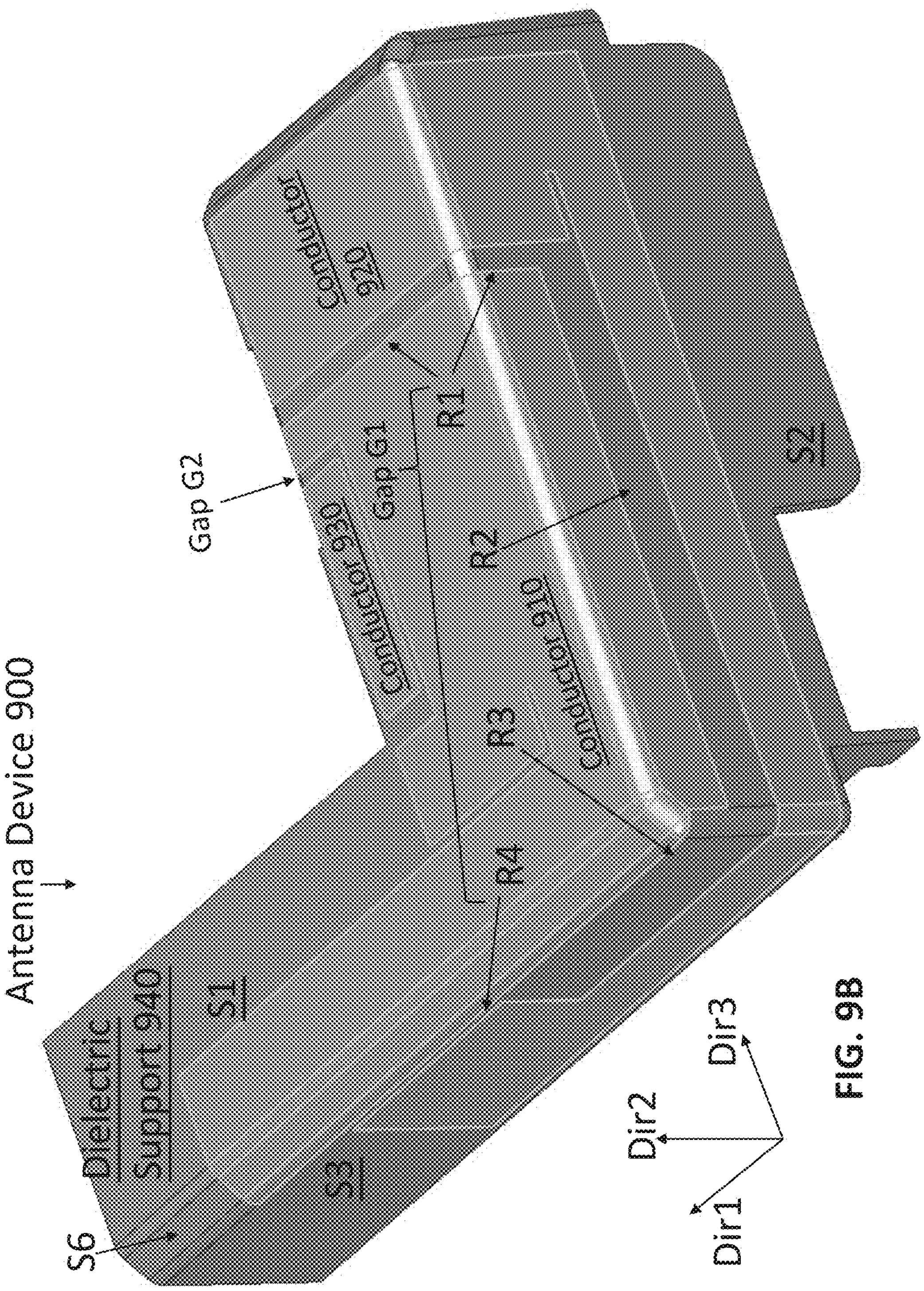
FIG. 9B is a second perspective view of the antenna device of FIG. 9A opposite the first perspective view illustrating further regions of the first gap.
Figure 9C:
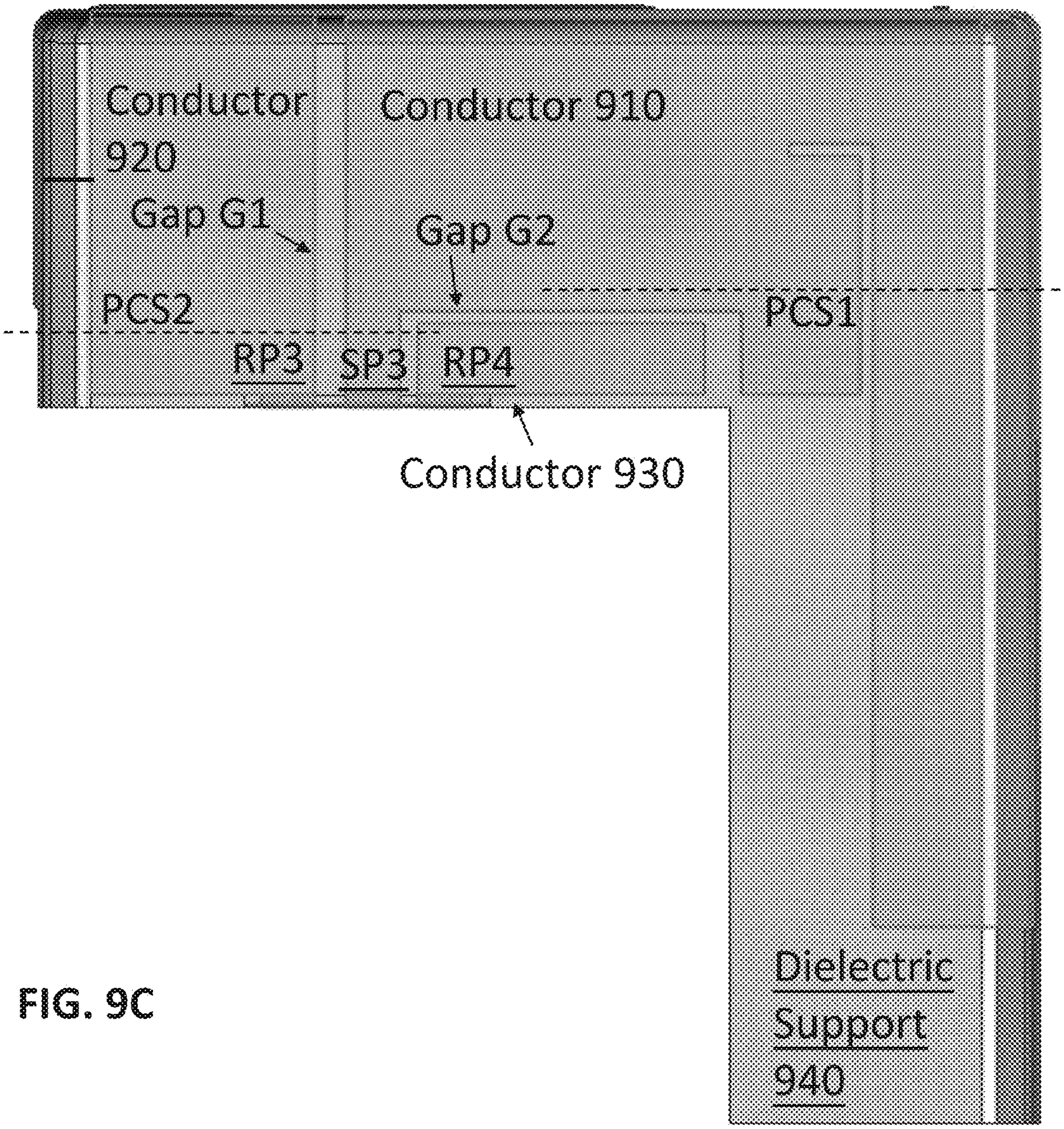
FIG. 9C is a top view of the antenna device of FIG. 9A further illustrating the first and second gaps.
Figure 9D:
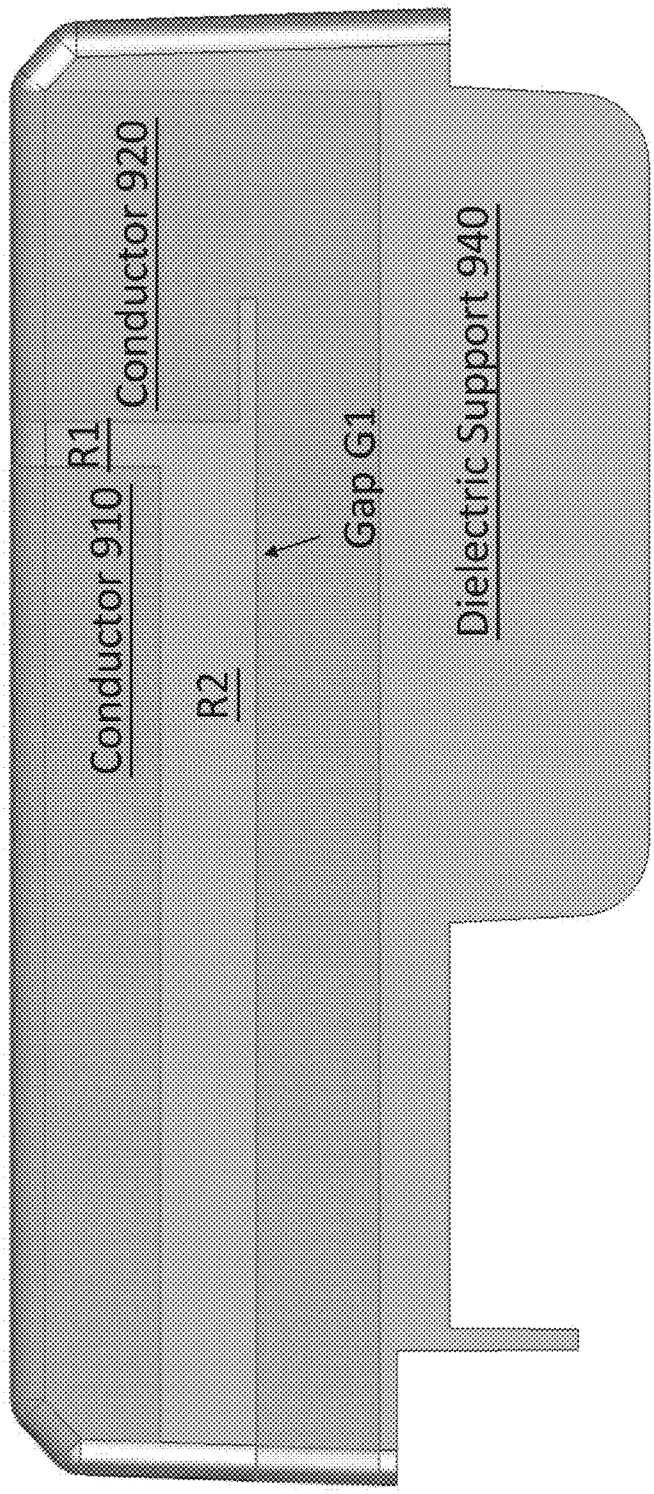
FIG. 9D is a side view of the antenna device of FIG. 9A further illustrating the first and second conductors.
Figure 9E:
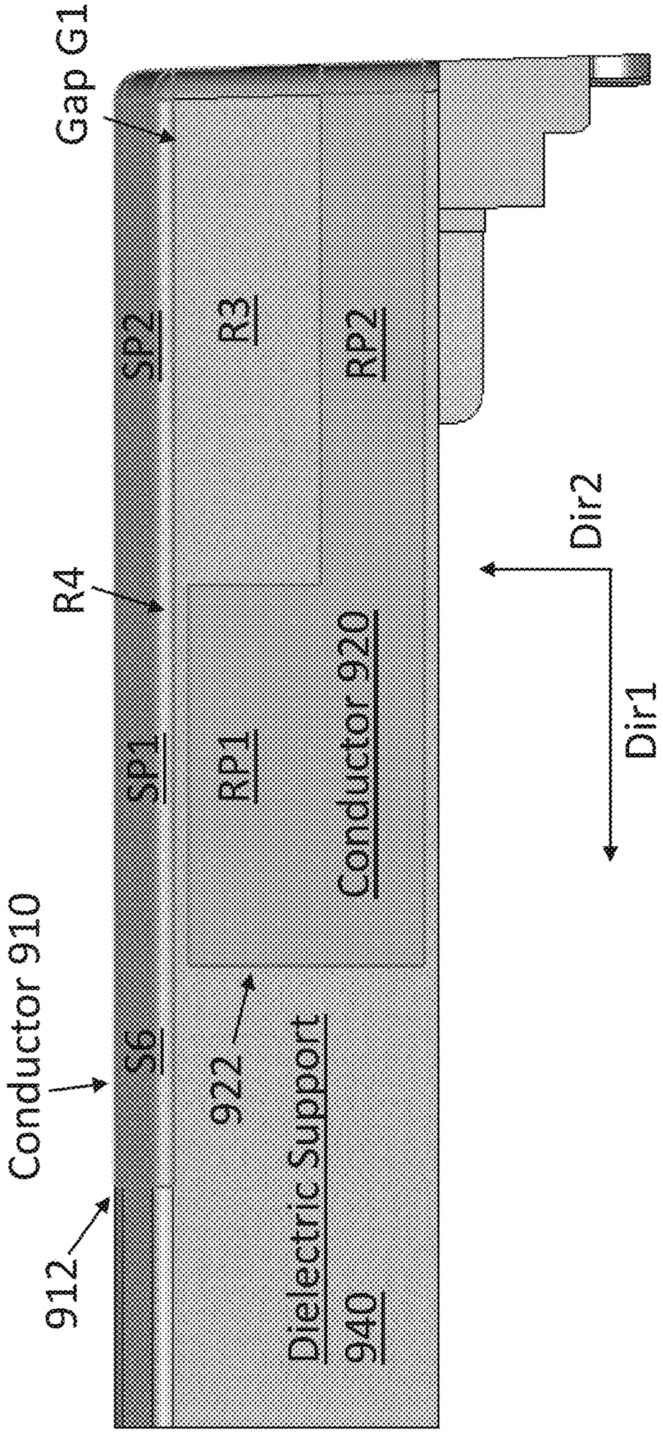
FIG. 9E is another side view of the antenna device of FIG. 9A further illustrating the first and second conductors.

FIG. 9A is a first perspective view of alternative example antenna device 900. FIG. 9B is a second perspective view of antenna device 900 opposite the first perspective view illustrating further regions of gap G1. FIG. 9C is a top view of antenna device 900 further illustrating gaps G1 and G2. FIG. 9D is a side view of antenna device 900 further illustrating first and second conductors 910 and 910. FIG. 9E is another side view of antenna device 900 further illustrating first and second conductors 910 and 920.

In some embodiments, antenna device 900 may be configured as described herein for antenna device 530*a* and may include the same or similar advantages. For example, as shown in FIGS. 9A-9B, antenna device 900 includes a dielectric support 940 having disposed thereon a first conductor 910 having a signal feed terminal 902*a*, a second conductor 920 having a first reference feed terminal 902*b*, and a third conductor 920 having a second reference feed terminal 902*c*. As further shown in FIG. 9B, a first gap G1 separates second conductor 920 from first conductor 910, first gap G1 including first region R1, second region R2, third region R3, and fourth region R4, each having a different gap distance separating first conductor 910 and second conductor 920. And, as shown in FIGS. 9A and 9C, a second gap G2 separates third conductor 930 from first conductor 910, second gap G2 including first region R1, second region R2, and third region R3 each having a different gap distance separating first conductor 910 and third conductor 930.

In some embodiments, portions of first conductor 910 may be configured to have different electromagnetic field amplitudes at a resonant frequency. For example, as shown in FIG. 9E, first conductor 910 includes a first signal portion SP1 electrically connected to signal feed terminal 902*a* and a second signal portion SP2 electrically connected to signal feed terminal 902*a*. For instance, first signal portion SP1 may be configured to have a first electromagnetic field amplitude at a first resonant frequency (e.g., 1700 MHz) when signal feed terminal 902*a* is driven at the first resonant frequency and second signal portion SP2 may be configured to have a second, lower electromagnetic field amplitude at the first resonant frequency when signal feed terminal 902*a* is driven at the first resonant frequency. As another example, as shown in FIG. 9E, first conductor 910 includes a third signal portion SP3 electrically connected to signal feed terminal 902*a*. For instance, third signal portion SP3 may be configured to have a third electromagnetic field amplitude at the first resonant frequency that is different from (e.g., larger than) the second electromagnetic field amplitude at second signal portion SP2 when signal feed terminal 902*a* is driven at the first resonant frequency. In the illustrated example, second signal portion SP2 is shown coupled between first signal portion SP1 and third signal portion SP3 (e.g., along a length of first conductor 910).

In some embodiments, gap regions between first conductor 910 and second conductor 920 may be configured to provide different amounts of coupling at a resonant frequency, such as described herein in connection with antenna device 300, which may provide the same or similar advantages. For example, as shown in FIG. 9E, second conductor 920 has a first reference portion RP1 spaced from first signal portion SP1 by a gap distance across region R4 and a second reference portion RP2 spaced from second signal portion SP2 by a gap distance across region R3. For instance, the gap distance across region R4 may be configured to provide a first amount of coupling between first signal portion SP1 and first reference portion RP1 at a first resonant frequency (e.g., 1700 MHz) and the gap distance across region R3 may be configured to provide a second (e.g., lesser) amount of coupling between second signal portion SP2 and second reference portion RP2 at the first resonant frequency. As another example, as shown in FIG. 9C, second conductor 920 further includes a third reference portion RP3 spaced from third signal portion SP3 by a gap distance across region R1. For instance, the gap distance across region R1 may be configured to provide a third amount of coupling between third signal portion SP3 and third reference portion RP3 at the first resonant frequency that is greater than the second amount of coupling between second signal portion SP2 and second reference portion RP2.

In some embodiments, gap regions between first conductor 910 and second conductor 920 may be configured to provide more coupling at the first resonant frequency than at a second (e.g., lower) resonant frequency. For example, the gap distance separating first signal portion SP1 and first reference portion RP1 may be configured to provide more coupling at the first resonant frequency (e.g., 1700 MHz) than at a second resonant frequency (e.g., 700 MHz). For instance, the amount of capacitive coupling between first signal portion SP1 and first reference portion RP1 may be attenuated at the second, lower resonant frequency due to the relatively higher impedance posed by the gap region at the lower resonant frequency.

In some embodiments, some gap regions between first conductor 910 and third conductor 930 may be configured to provide more coupling at a resonant frequency than some gap regions between first conductor 910 and third conductor 930 and vice versa. For example, as shown in FIG. 9C, third conductor 930 includes fourth reference portion RP4 spaced from third signal portion SP3 by a gap distance across region R1 of gap G2. For instance, the gap distance across region R1 of gap G2 may be configured to provide a fourth amount of coupling between third signal portion SP3 and fourth reference portion RP4 at the first resonant frequency (e.g., 1700 MHz) that is less than the third amount of coupling between third signal portion SP3 and third reference portion RP3. On the other hand, the gap distance between third signal portion SP3 and third reference portion RP3 may be configured to provide a fifth amount of coupling at a third resonant frequency (e.g., 2700 MHz) that is less than a sixth amount of coupling at the third resonant frequency that the gap distance between third signal portion SP3 and fourth reference portion RP4 may be configured to provide.

In some embodiments, antenna device 900 may have first and second conductor terminations that are offset, such as described herein in connection with antenna device 400, which may provide the same or similar advantages. For example, as shown in FIG. 9E, first signal portion SP1 is elongated in a first direction Dir1 and includes a first conductor termination 912 in first direction Dir1. Also shown in FIG. 9E, first reference portion RP1 is elongated in first direction Dir1, spaced from first signal portion SP1 in a second direction Dir2 perpendicular to first direction Dir1 by a gap distance across region R4, and includes a second conductor termination 922 in first direction. For instance, in FIG. 9E, first conductor termination 912 is offset from second conductor termination 922 in first direction Dir1.

In some embodiments, antenna device 900 may have portions elongated in a same direction and spaced from one another by different gap distances, such as described herein in connection with antenna device 400, which may provide the same or similar advantages. For example, as shown in FIG. 9E, second signal portion SP2 is elongated in first direction Dir1 and terminates in first direction Dir1 in first signal portion SP1. Also shown in FIG. 9E, second reference portion RP2 is elongated in first direction Dir1 and spaced from second signal portion SP2, in second direction Dir2, by a gap distance across region R3 that is greater than the gap distance across region R4, and second reference portion RP2 terminates in first direction Dir1 at first reference portion RP1.

In some embodiments, antenna device 900 may have conductors spaced from one another in different directions. For example, as shown in FIG. 9B, third conductor 930 is spaced from first conductor 910 in a third direction Dir3 that is perpendicular first direction Dir1, and at least a portion of first conductor 910 is positioned between second conductor 920 and third conductor 930 in third direction Dir3. In FIG.

9C, two partial cross-sections PCS1 and PCS2 are indicated by dashed lines where portions of first conductor 910 are positioned between second conductor 920 and third conductor 930 in third direction Dir3, though in other embodiments, fewer or more portions of first conductor 910 may be positioned between second conductor 920 and third conductor 930 in third direction Dir3. In the illustrated embodiment, third direction Dir3 is perpendicular to each of first direction Dir1 and Dir2, such that at least some portions of first and second conductors 910 and 920 are spaced from one another in a direction (e.g., Dir2) perpendicular to a direction (e.g., Dir3) in which first and third conductors 910 and 930 are spaced from one another. In some embodiments (e.g., in FIG. 8B), first and second conductors (e.g., 534*a* and 534*b*) may be spaced from one another in a same direction (e.g., Dir3 in FIG. 9B) as first and third conductors (e.g., 534*a* and 534*c*).

In some embodiments, first conductor 910 may be disposed on at least three planar surfaces of dielectric support 940. For example, in addition to being disposed on first and second planar surfaces S1 and S2, first conductor 910 is shown in FIG. 9B being disposed on another planar surface S6 connected between S1 and S3. In the illustrated embodiment, first and second signal portions SP1 and SP2 are disposed, at least in part, on a common planar surface S6, first and second signal portions SP1 and SP2 are disposed, at least in part, on another surface S1, though in other embodiments, first and second signal portions SP1 and SP2 may be disposed, at least in part, on only one common surface. Also in the illustrated embodiment, first and second reference portions RP1 and RP2 are disposed on a common planar surface S3, though in other embodiments, first and second reference portions RP1 and RP2 may be further disposed on another common planar surface.

Figure 10A:
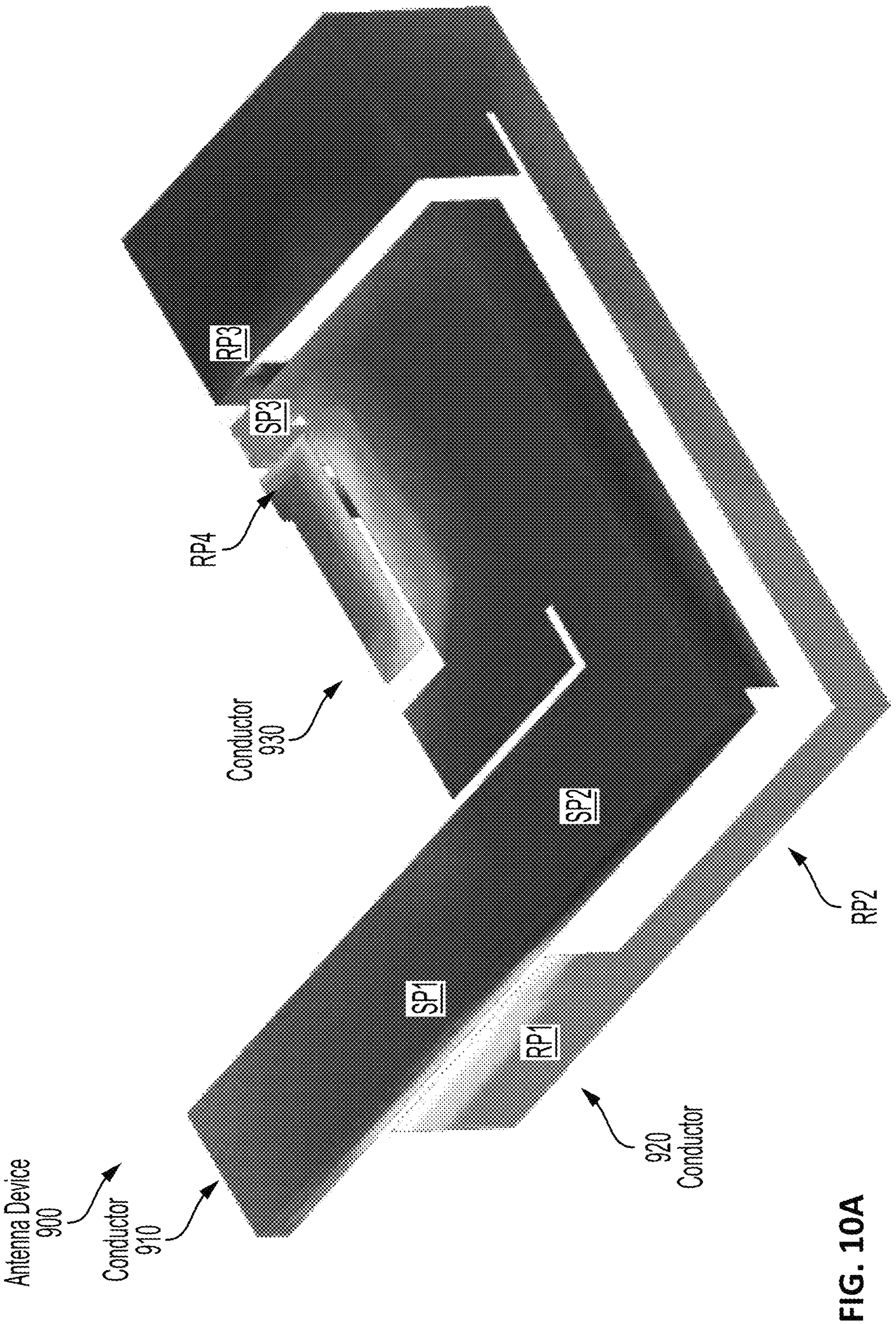
FIG. 10A illustrates simulated electric field amplitude in conductors of the antenna device of FIG. 9A at 700 MHz.
Figure 10B:
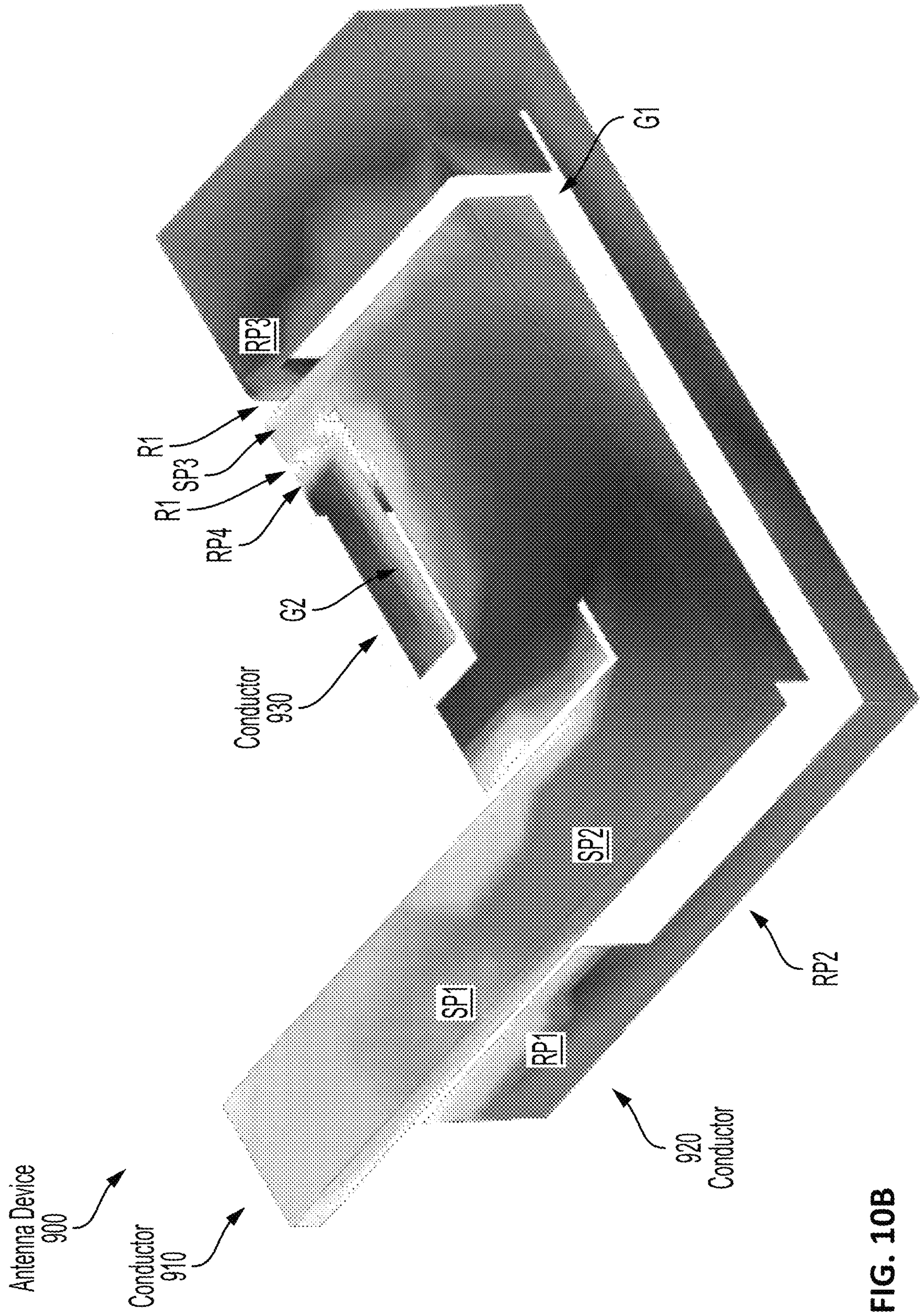
FIG. 10B illustrates simulated electric field amplitude in conductors of the antenna device of FIG. 9A at 1700 MHz.
Figure 10C:
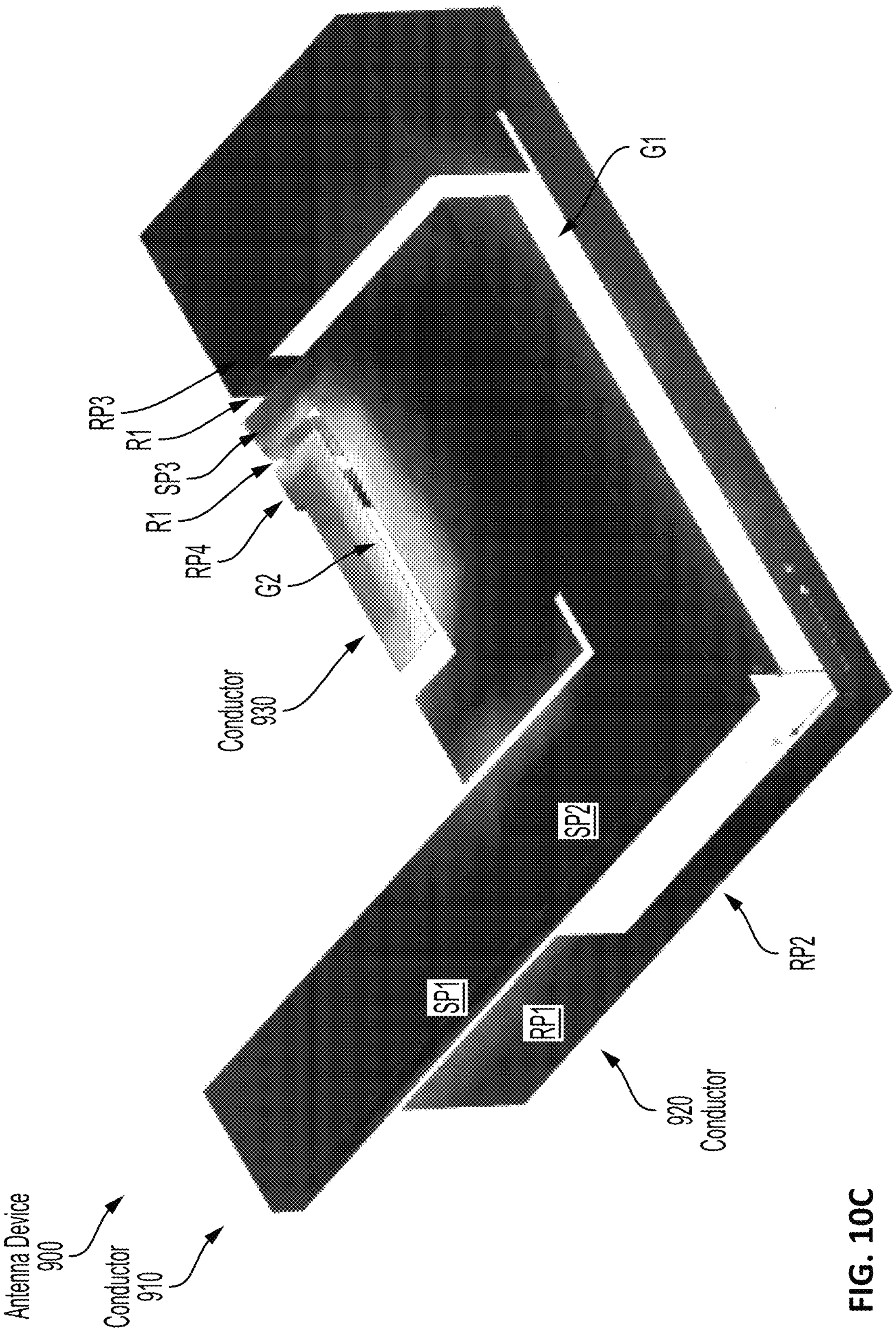
FIG. 10C illustrates simulated electric field amplitude in conductors of the antenna device of FIG. 9A at 2600 MHz.

FIGS. 10A-10C illustrate simulated electric field amplitudes in conductors of antenna device 900 at various resonant frequencies. FIG. 10A illustrates simulated electric field amplitude in conductors of antenna device 900 at 700 MHz. FIG. 10B illustrates simulated electric field amplitude in conductors of antenna device 900 at 1700 MHz. FIG. 10C illustrates simulated electric field amplitude in conductors of antenna device 900 at 2600 MHz.

As shown in FIGS. 10A-10C, portions of first conductor 910 may have different electric field amplitudes at different resonant frequencies. For example, as shown in FIG. 10A, first signal portion SP1 has a higher electric field amplitude at 700 MHz than other portions of first conductor 910, such as second signal portion SP2. As another example, as shown in FIG. 10B, each of first signal portion SP1 and third signal portion SP3 has larger electric field amplitudes at 1700 MHz than second signal portion SP2. In some cases, the large electric field amplitude at third signal portion SP3 at 1700 MHz may be due, at least in part, to the shorter wavelength at 1700 MHz as compared to 700 MHz, and the closer proximity to signal feed terminal 902*a* than first signal portion SP1. And, as shown in FIG. 10C, the largest electric field amplitude at 2600 MHz is at third signal portion SP3, for instance due to the even shorter wavelength at 2600 MHz than at 1700 MHz, and the close proximity to signal feed terminal 902*a*.

Figure 11A:
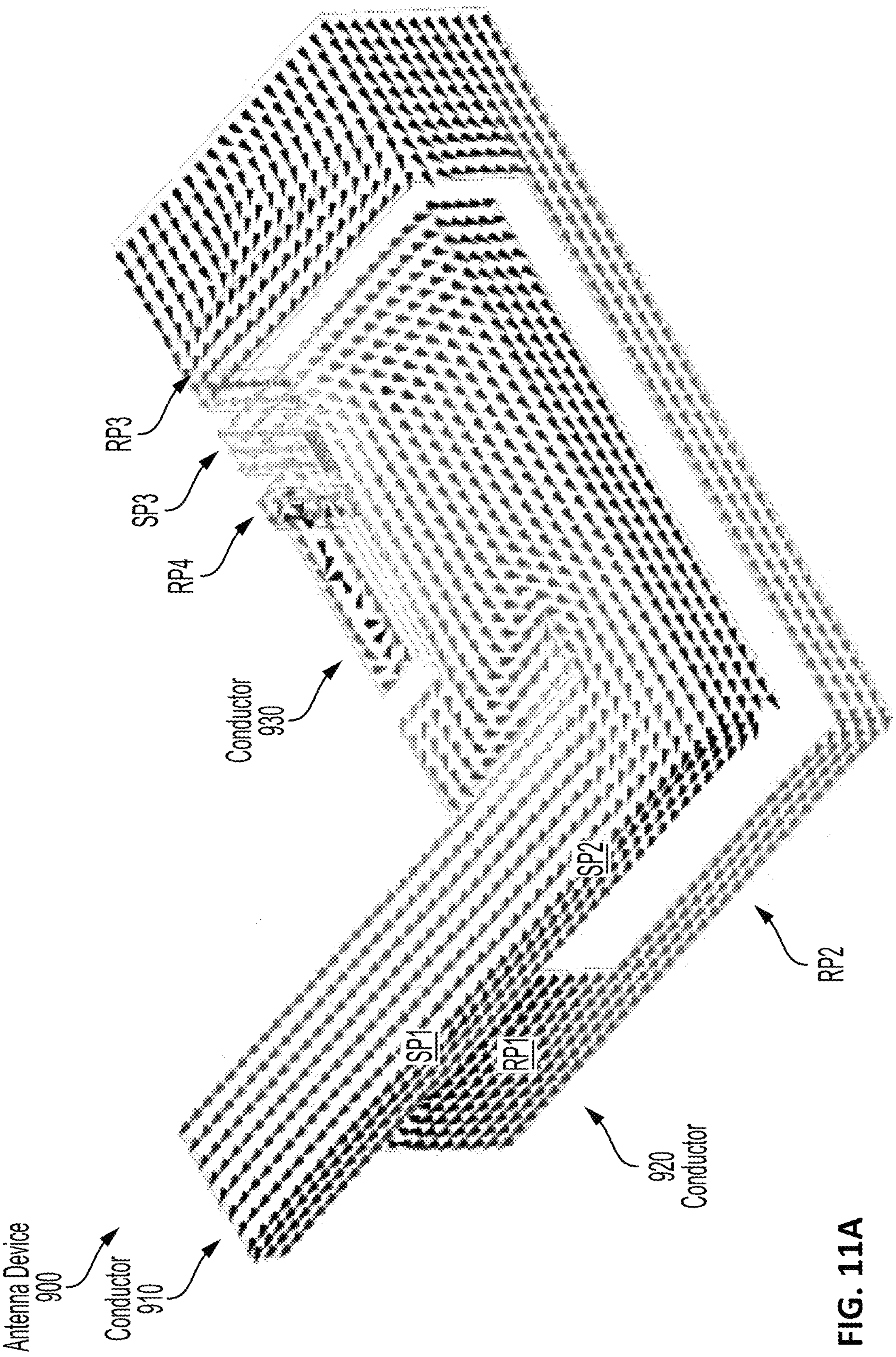
FIG. 11A illustrates vector surface current density in conductors of the antenna device of FIG. 9A at 700 MHz.
Figure 11B:
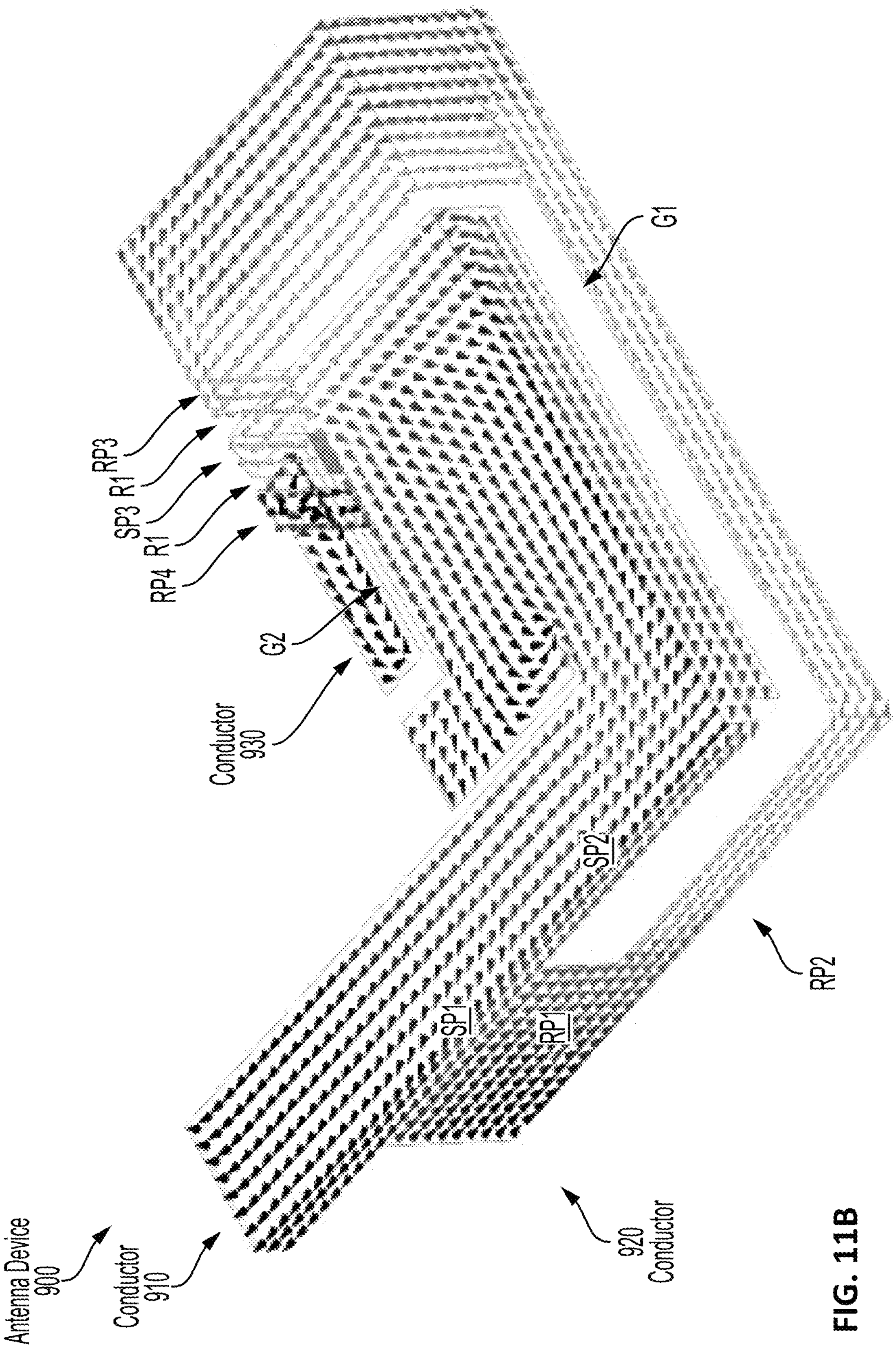
FIG. 11B illustrates vector surface current density in conductors of the antenna device of FIG. 9A at 1700 MHz.
Figure 11C:
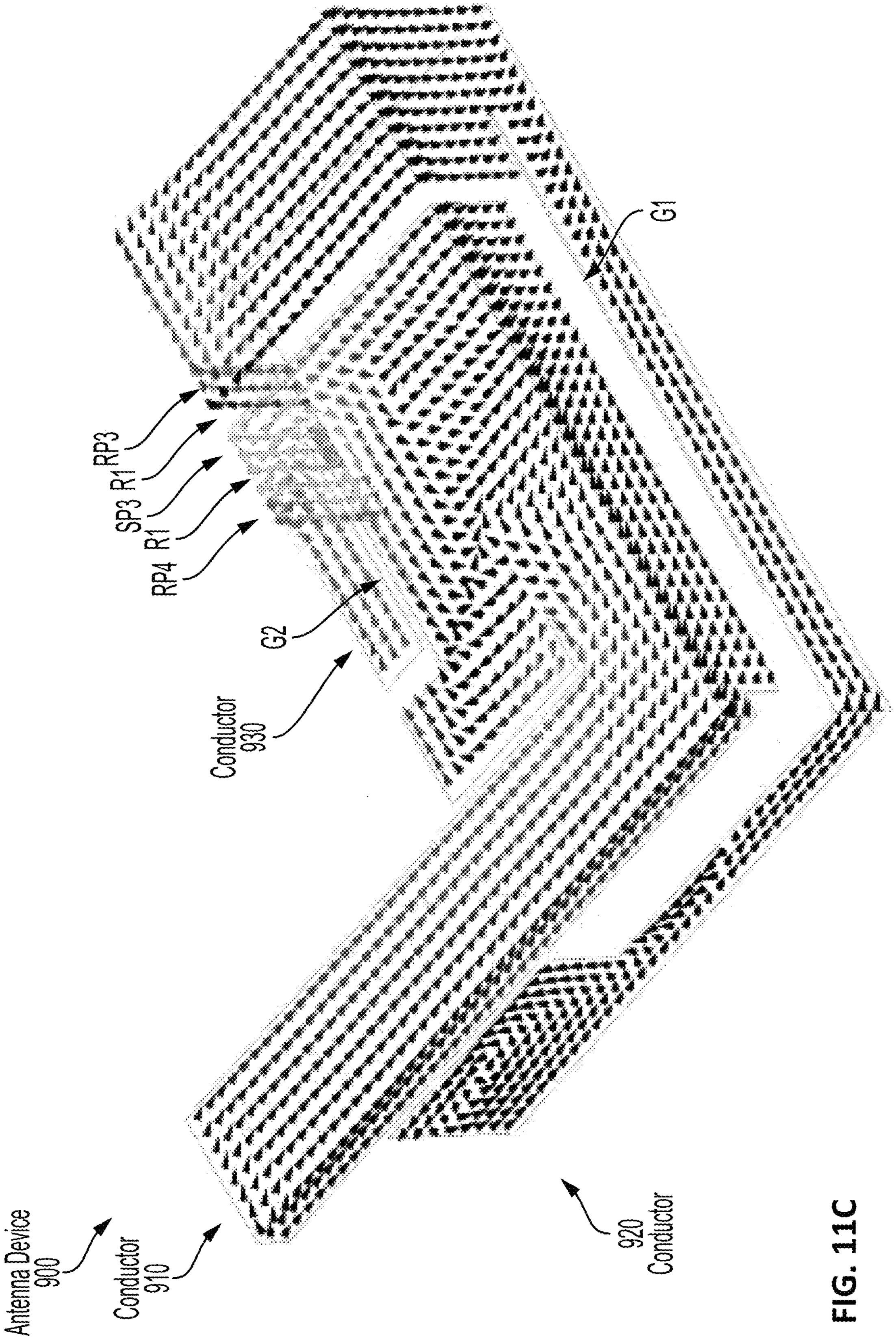
FIG. 11C illustrates vector surface current density in conductors of the antenna device of FIG. 9A at 2600 MHz.

FIGS. 11A-11C illustrate vector surface current density in conductors of antenna device 900 at the resonant frequencies of FIGS. 10A-10C, respectively. FIG. 11A illustrates vector surface current density in conductors of antenna device 900 at 700 MHz. FIG. 11B illustrates vector surface current density in conductors of antenna device 900 at 1700 MHz. FIG. 11C illustrates vector surface current density in conductors of antenna device 900 at 2600 MHz.

As shown in FIGS. 10A-10C, differences in coupling between first conductor 910 and second and third conductors 920 and 930 at different resonant frequencies may be further accentuated by differences in surface current density. For example, as shown in FIG. 11A, large surface current densities are present in first conductor 910 at 700 MHz, but comparatively less current density is present in second conductor 920, such as due to little capacitive coupling between first signal portion SP1 of first conductor 910 and first reference portion RP1 of second conductor 930 at the low band. In contrast, in FIG. 11B, significantly more current density is present in second conductor 920 at 1700 MHz than at 700 MHz, for instance due to greater coupling between first signal portion SP1 and first reference portion RP1 at the mid band. Also shown in FIG. 11B, much higher current density is present in third reference portion RP3 of second conductor 920 at 1700 MHz than at 700 MHz, for instance due to higher coupling from third signal portion SP3 across gap region R1 at 1700 MHz than at 700 MHz, and due to the shorter wavelength and closer proximity to signal feed terminal 902*a*.

As another example, in FIGS. 11B-11C, third reference portion RP3 shows higher surface current density than fourth reference portion RP4 of third conductor 930 at 1700 MHz, whereas fourth reference portion RP4 shows comparatively higher surface current density at 2600 MHz than at 1700 MHz, for instance due to higher coupling across regions of gap G2 between first and third conductors 910 and 930 than across regions of gap G1, and due to the shorter wavelength and shorter length of third conductor 930 than second conductor 920. Further shown by comparing FIGS. 11B and 11C, surface current density at 2600 MHz is concentrated at third signal portion SP3 of first signal conductor 910 closer to signal feed terminal 902*a* than at 1700 MHz, again, due to the shorter wavelength.

Figure 12:
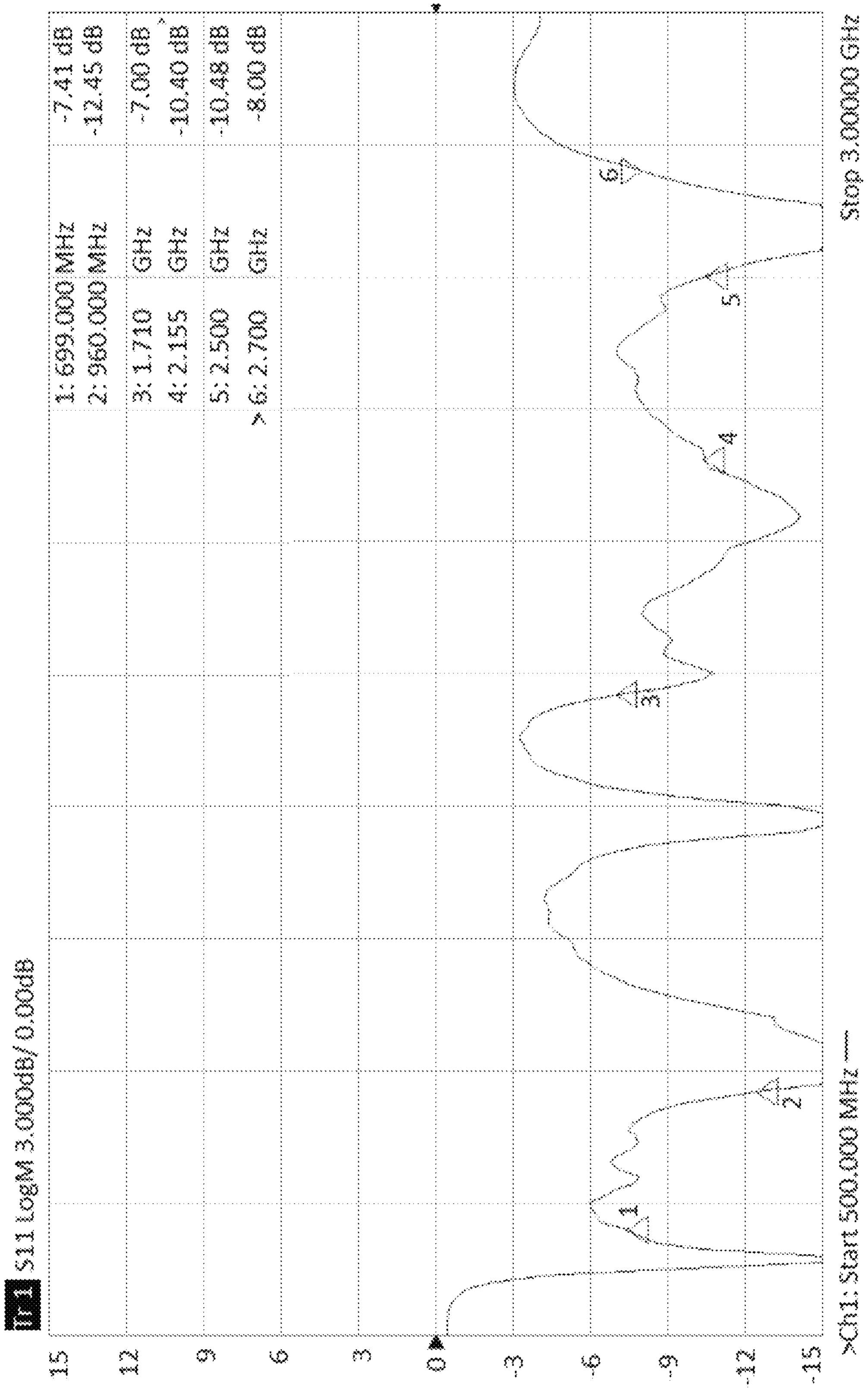
FIG. 12 illustrates measured return loss of the antenna device of FIG. 9A from 500 MHz to 3000 MHz.

FIG. 12 illustrates measured return loss of antenna device 900 from 500 MHz to 3000 MHz. As shown in FIG. 12, antenna device 900 may be configured to provide less than −6 dB of return loss over a first frequency range from 699 MHz to 960 MHz, a second frequency range from 1710 MHz to 2155 MHz, and a third frequency range from 2500 MHz to 2600 MHz. Also shown in FIG. 12, antenna device 900 may be further configured to provide less than −6 dB of return loss over the frequency range from 1710 MHz to 2700 MHz.

Figure 13:
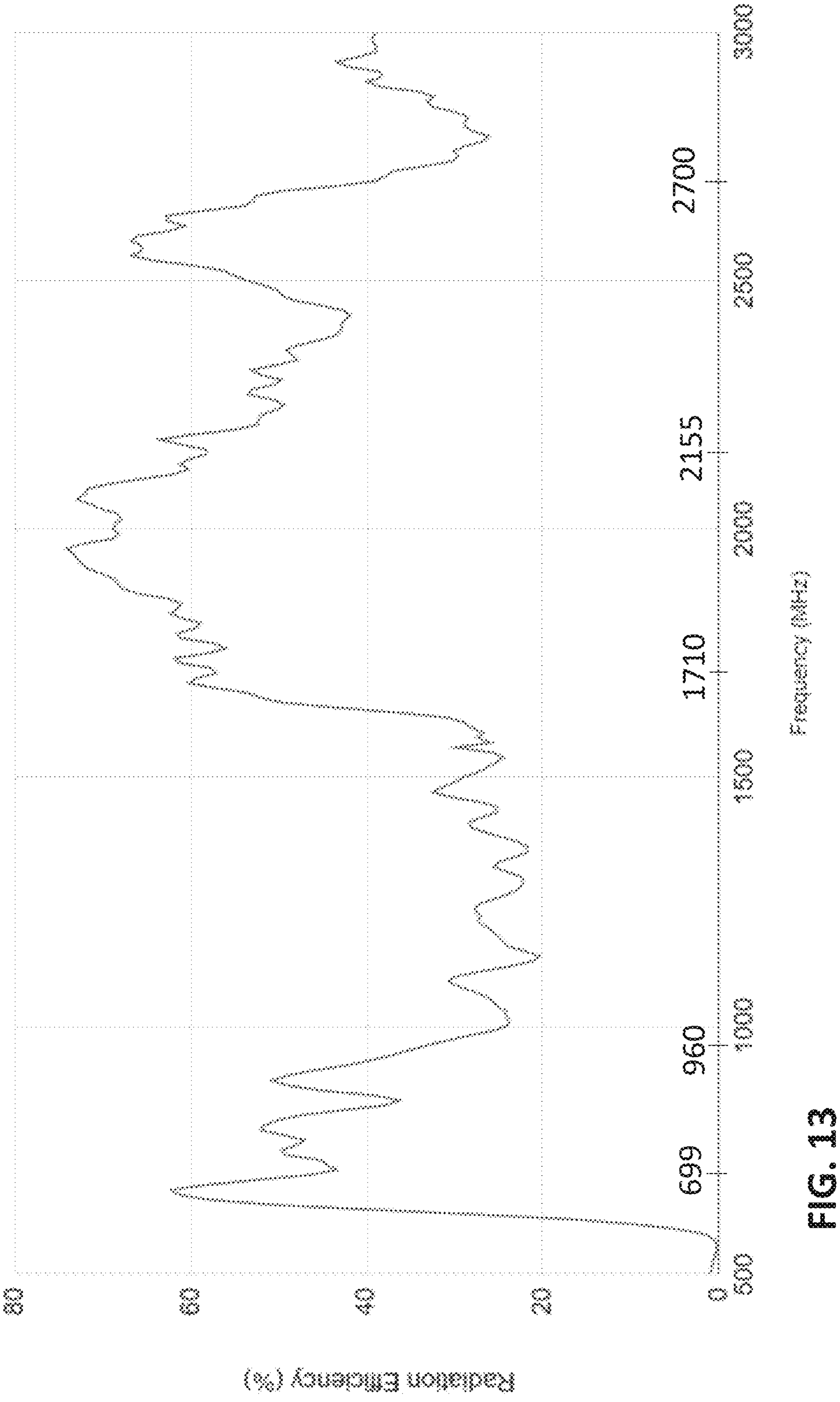
FIG. 13 illustrates measured radiation efficiency of the antenna device of FIG. 9A from 500 MHz to 3000 MHz.

FIG. 13 illustrates measured radiation efficiency of antenna device 900 from 500 MHz to 3000 MHz. As shown in FIG. 13, antenna device 900 may be configured to provide radiation efficiency of at least 30% over the first frequency range from 699 MHz to 960 MHz, the second frequency range from 1710 MHz to 2155 MHz, and the third frequency range from 2500 MHz to 2600 MHz. Also shown in FIG. 13, antenna device 900 may be further configured to provide radiation efficiency of at least 40% over the frequency range from 1710 MHz to 2700 MHz, and radiation efficiency of at least 50% over the frequency range from 2500-2700 MHz.

While FIGS. 12-13 illustrate measured return loss and radiation efficiency between 699 MHz and 2700 MHz, it is appreciated that antenna device 900 may be scaled up or down in size to achieve similar performance at other frequency ranges, such as between 2376 MHz and 9180 MHz.

Figure 14A:
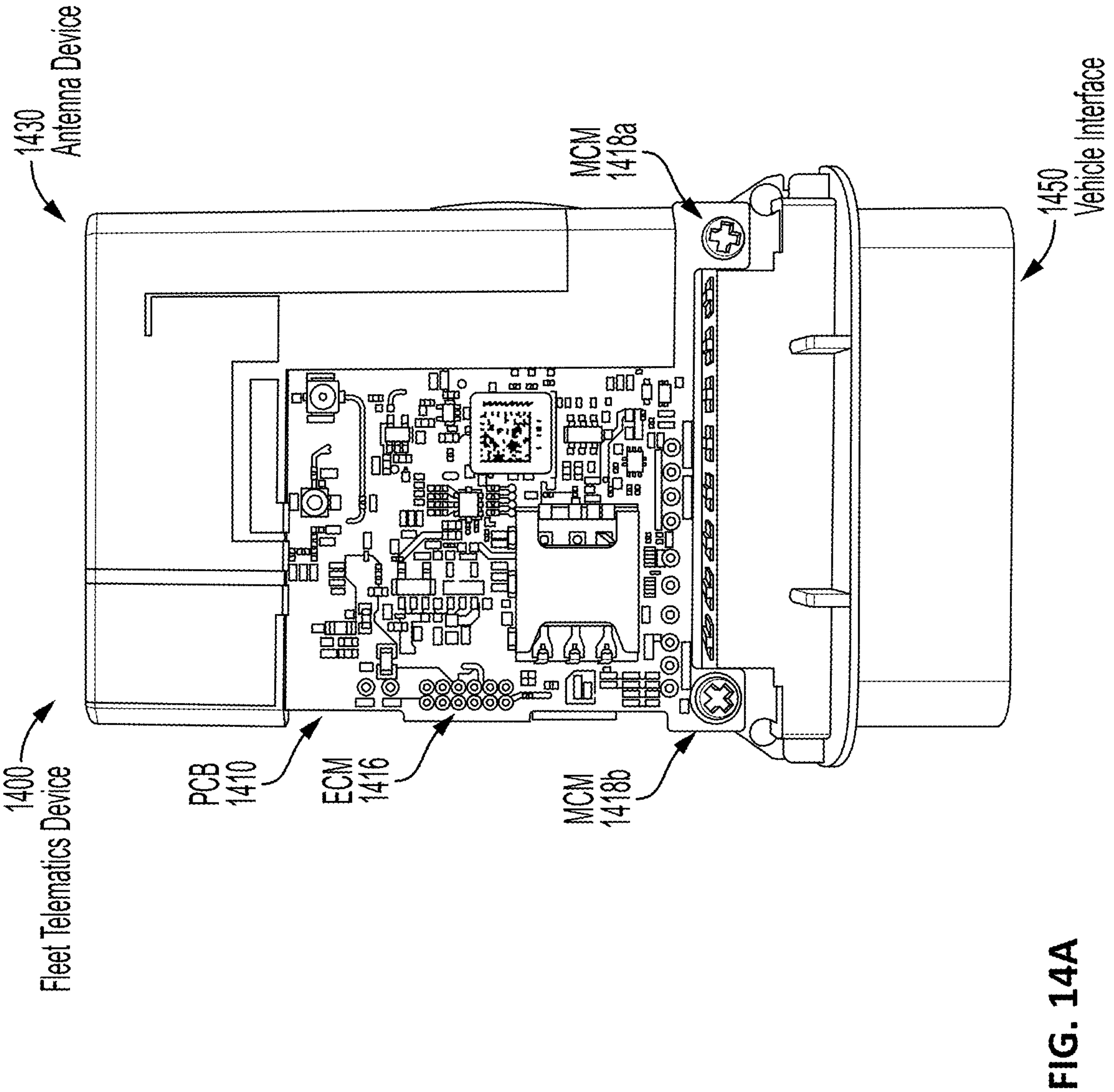
FIG. 14A illustrates a fleet telematics device with its device housing removed and having the antenna device of FIG. 9A incorporated therein.
Figure 14B:
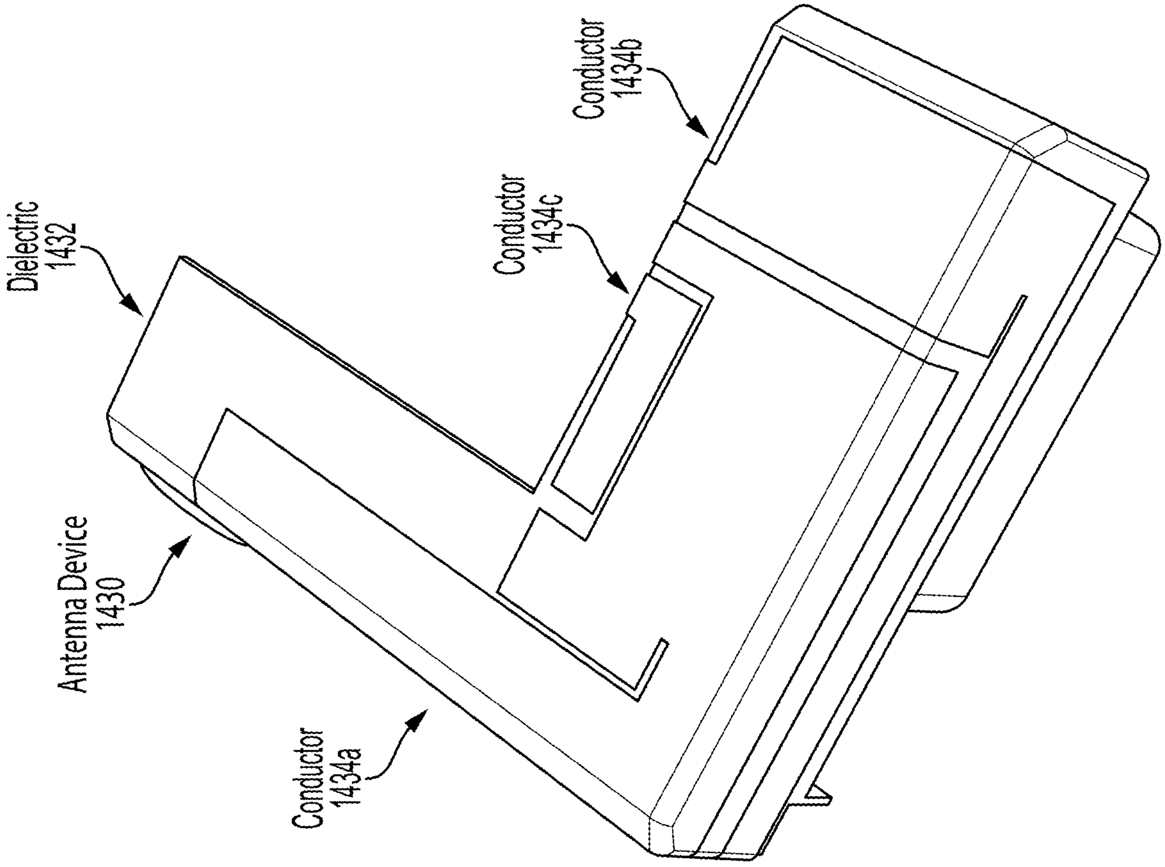
FIG. 14B illustrates a perspective view of the antenna device of FIG. 14A.

FIG. 14A illustrates a fleet telematics device 1400 with its device housing removed and having an antenna device 1430 incorporated therein. FIG. 14B illustrates a perspective view of antenna device 1430.

In some embodiments, fleet telematics device 1400 may be configured in the manner described herein for fleet telematics device 150. For example, as shown in FIG. 14A, fleet telematics device 1400 includes a PCB 1410 and vehicle interface 1450. In some embodiments, fleet telematics device 1400 may be further configured as described herein for mobile device 500. For example, as shown in FIG. 14A, fleet telematics device 1400 includes electrical coupling member (ECM) 1416 and mechanical coupling members 1418*a* and 1418*b*, which may be configured to electrically and mechanically couple PCB 1410 to another PCB (not shown, e.g., 510*b*) below PCB 1410. In some embodiments, the PCBs may have conductive layers (e.g., 512*a*, 512*b*) configured as ground plane layers. In some embodiments, the other PCB (not shown, e.g., 510*b*) may include another antenna device (not shown, e.g., 530*b*).

In some embodiments, antenna device 1430 may be configured as described herein for antenna device 900. For example, as shown in FIG. 14B, antenna device 1430 includes dielectric support 1432 having first conductor 1434*a*, second conductor 1434*b*, and 1434*c* disposed thereon, for instance, using an LDS process.

The figures are not necessarily drawn to scale and may be illustrated by phantom lines, diagrammatic representations, and fragmentary views. In certain instances, details that are not necessary for an understanding of the exemplary embodiments or that render other details difficult to perceive may have been omitted. Similarly, not every component is labeled in every figure.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. An antenna device, comprising:

a dielectric support;

a first conductor disposed on the dielectric support, the first conductor comprising:

a signal feed terminal;

a first signal portion electrically connected to the signal feed terminal and configured to have a first electromagnetic field amplitude at a first resonant frequency when the signal feed terminal is driven at the first resonant frequency; and a second signal portion electrically connected to the signal feed terminal and configured to have a second electromagnetic field amplitude at the first resonant frequency when the signal feed terminal is driven at the first resonant frequency, wherein the first electromagnetic field amplitude is larger than the second electromagnetic field amplitude; and a second conductor disposed on the dielectric support and comprising:

a reference feed terminal;

a first reference portion electrically connected to the reference feed terminal and spaced from the first signal portion by a first gap distance, the first gap distance configured to provide a first amount of coupling between the first signal portion and the first reference portion at the first resonant frequency; and a second reference portion electrically connected to the reference feed terminal, spaced from the second signal portion by a second gap distance greater than the first gap distance, and configured to provide a second amount of coupling between the second signal portion and the second reference portion at the first resonant frequency, the first amount of coupling being larger than the second amount of coupling.

2. The antenna device of claim 1, wherein:

the second signal portion is coupled between the signal feed terminal and the first signal portion; and the second reference portion is coupled between the reference feed terminal and the first reference portion.

3. The antenna device of claim 1, wherein the first gap distance is configured to tune an impedance of the antenna device at the first resonant frequency and the second gap distance is configured to tune the impedance of the antenna device at a second resonant frequency different from the first resonant frequency.

4. The antenna device of claim 3, wherein:

the first conductor further comprises a third signal portion electrically connected to the signal feed terminal; and the second conductor further comprises a third reference portion electrically connected to the reference feed terminal and spaced from the third signal portion by a third gap distance smaller than the second gap distance and configured to provide a third amount of coupling between the third signal portion and the third reference portion at the first resonant frequency, the third amount of coupling being larger than the second amount of coupling.

5. The antenna device of claim 4, wherein the second signal portion is coupled between the first signal portion and the third signal portion, and the second reference portion is coupled between the first reference portion and the third reference portion.

6. The antenna device of claim 4, wherein the third signal portion is configured to have a third electromagnetic field amplitude at the first resonant frequency, that is larger than the second electromagnetic field amplitude, when the signal feed terminal is driven at the first resonant frequency.

7. The antenna device of claim 4, further comprising:

a third conductor disposed on the dielectric support and comprising a second reference feed terminal and a fourth reference portion electrically coupled to the second reference feed terminal separated from the third signal portion by a fourth gap distance, wherein:

the fourth gap distance is configured to provide a fourth amount of coupling between the third signal portion and the fourth reference portion at the first resonant frequency that is less than the third amount of coupling;

the fourth gap distance is configured to provide a fifth amount of coupling between the third signal portion and the fourth reference portion at a third resonant frequency different from the first resonant frequency and the second resonant frequency; and the third gap distance is configured to provide a sixth amount of coupling between the third signal portion and the third reference portion at the third resonant frequency that is less than the fifth amount of coupling.

8. The antenna device of claim 1, wherein the antenna device is configured as a standing wave antenna device.

9. The antenna device of claim 8, wherein the first conductor comprises at least one member selected from the group consisting of:

a monopole;

an inverted-F;

a dipole; and a patch.

10. The antenna device of claim 9, wherein the first conductor and the second conductor are configured to form a coupled line.

11. The antenna device of claim 1, wherein the antenna device is configured to operate in:

a first frequency band contained in a first frequency range from 699 MHz to 1710 MHz;

a second frequency band contained in a second frequency range from 1710 MHz to 2400 MHz; and a third frequency band contained in a third frequency range from 2400 MHz to 3 GHz.

12. The antenna device of claim 11, wherein the third frequency band is contained in a frequency range from 2483 MHz to 2690 MHz.

13. A system, comprising:

an antenna device, comprising:

a dielectric support;

a first conductor disposed on the dielectric support, the first conductor comprising:

a signal feed terminal;

a first signal portion electrically connected to the signal feed terminal; and a second signal portion electrically connected to the signal feed terminal; and a second conductor disposed on the dielectric support and comprising:

a reference feed terminal;

a first reference portion electrically connected to the reference feed terminal and spaced from the first signal portion by a first gap distance; and a second reference portion electrically connected to the reference feed terminal, spaced from the second signal portion by a second gap distance greater than the first gap distance; and circuitry coupled to the antenna device and configured to transmit and/or receive signals via the antenna device, the circuitry comprising a feed port coupled to the signal feed terminal of the first conductor and a reference port coupled to reference feed terminal of the second conductor, wherein the circuitry is configured to drive the signal feed terminal via the feed port at a first resonant frequency to produce:

a first electromagnetic field amplitude at the first signal portion;

a first amount of coupling between the first signal portion and the first reference portion across the first gap distance;

a second electromagnetic field amplitude at the second signal portion, the first electromagnetic field amplitude being larger than the second electromagnetic field amplitude; and a second amount of coupling between the second signal portion and the second reference portion across the second gap distance, the first amount of coupling being larger than the second amount of coupling.

14. The system of claim 13, further comprising a housing and a circuit board, the antenna device and the circuit board being disposed within the housing, and the circuit board comprising the circuitry.

15. The system of claim 14, wherein the circuitry is configured to drive the signal feed terminal of the antenna device in:

a first frequency band contained in a first frequency range from 699 MHz to 1710 MHz;

a second frequency band contained in a second frequency range from 1710 MHz to 2400 MHz; and a third frequency band contained in a third frequency range from 2400 MHz to 3 GHz.

16. The system of claim 15, wherein the third frequency band is contained in a frequency range from 2483 MHz to 2690 MHz.

17. A method of operating an antenna device comprising a dielectric support, a first conductor disposed on the dielectric support, and a second conductor disposed on the dielectric support, the method comprising:

driving a signal feed terminal of the first conductor at a first resonant frequency to produce:

a first electromagnetic field amplitude at a first signal portion of the first conductor that is electrically connected to the signal feed terminal;

a first amount of coupling between the first signal portion and a first reference portion of the second conductor across a first gap distance spacing apart the first signal portion and the first reference portion, the second conductor comprising a reference feed terminal and the first reference portion being electrically connected to the reference feed terminal;

a second electromagnetic field amplitude at a second signal portion of the first conductor that is electrically connected to the signal feed terminal, the first electromagnetic field amplitude being larger than the second electromagnetic field amplitude; and a second amount of coupling between the second signal portion and a second reference portion of the second conductor across a second gap distance spacing apart the second signal portion and the second reference portion, the second reference portion being electrically connected to the reference feed terminal, and the first amount of coupling being larger than the second amount of coupling.

18. The method of claim 17, wherein:

the first gap distance tunes an impedance of the antenna device at the first resonant frequency; and the second gap distance tunes the impedance of the antenna device at a second resonant frequency different from the first resonant frequency.

19. The method of claim 17, wherein driving the signal feed terminal of the antenna device comprises driving the signal feed terminal in:

a first frequency band contained in a first frequency range from 699 MHz to 1710 MHz;

a second frequency band contained in a second frequency range from 1710 MHz to 2400 MHz; and a third frequency band contained in a third frequency range from 2400 MHz to 3 GHz.

20. The method of claim 19, wherein the third frequency band is contained in a frequency range from 2483 MHz to 2690 MHz.

* * * * *